(12) United States Patent
Ross et al.

(10) Patent No.: US 9,178,974 B2
(45) Date of Patent: Nov. 3, 2015

(54) TRANSACTION SECURITY METHOD AND SYSTEM

(75) Inventors: Cameron Peter Sutherland Ross, Hertfordshire (GB); James Heath, Manchester (GB); Thomas Edward Briden, Manchester (GB); Ryan Peter Bamford, Salford (GB)

(73) Assignee: Veritape Ltd, Manchester (GB)

( * ) Notice: Subject to any disclaimer, the term of this patent is extended or adjusted under 35 U.S.C. 154(b) by 123 days.

(21) Appl. No.: 13/636,372

(22) PCT Filed: Mar. 22, 2011

(86) PCT No.: PCT/GB2011/000406
§ 371 (c)(1),
(2), (4) Date: Feb. 7, 2013

(87) PCT Pub. No.: WO2011/117573
PCT Pub. Date: Sep. 29, 2011

(65) Prior Publication Data
US 2013/0136242 A1    May 30, 2013

(30) Foreign Application Priority Data
Mar. 22, 2010    (GB) .................................. 1004754.6

(51) Int. Cl.
*H04M 1/64*    (2006.01)
*H04M 1/65*    (2006.01)
*H04M 3/51*    (2006.01)

(52) U.S. Cl.
CPC *H04M 1/65* (2013.01); *H04M 3/51* (2013.01); *H04M 2203/6009* (2013.01)

(58) Field of Classification Search
CPC ....................................................... H04M 1/65
USPC ............................................. 379/93.02, 93.12
See application file for complete search history.

(56) References Cited

U.S. PATENT DOCUMENTS

| 5,838,773 | A  | 11/1998 | Eisner et al. |
| 2004/0193897 | A1* | 9/2004 | Van Volkenburgh .......... 713/189 |
| 2006/0028488 | A1* | 2/2006 | Gabay et al. .................. 345/626 |
| 2007/0206765 | A1 | 9/2007 | Shaffer et al. |
| 2011/0228919 | A1* | 9/2011 | Tew et al. .................. 379/93.12 |

FOREIGN PATENT DOCUMENTS

| WO | WO-2008/002587 A2 | 1/2008 |
| WO | WO-2008/002587 A3 | 12/2008 |
| WO | 2009136163 A2 | 11/2009 |

* cited by examiner

*Primary Examiner* — Simon King
(74) *Attorney, Agent, or Firm* — Dickstein Shapiro LLP

(57) ABSTRACT

There is described method and apparatus for processing signals of a telephonic communication, where the signals represent sensitive and non-sensitive information. A described method comprises processing the signals to provide a first version of the signals that is to be recorded and a second version of the signals that is to be output as audio; monitoring at least the first version of the signals to detect, in said at least the first version of the signals, one or more instances of one or more predetermined characteristics that represent the sensitive information conveyed by the signals; and modifying said at least the first version of the signals by removing the identified predetermined characteristics from said at least the first version of the signals.

60 Claims, 14 Drawing Sheets

TRANSACTION SECURITY METHOD AND SYSTEM

FIELD OF THE INVENTION

Figure 1:
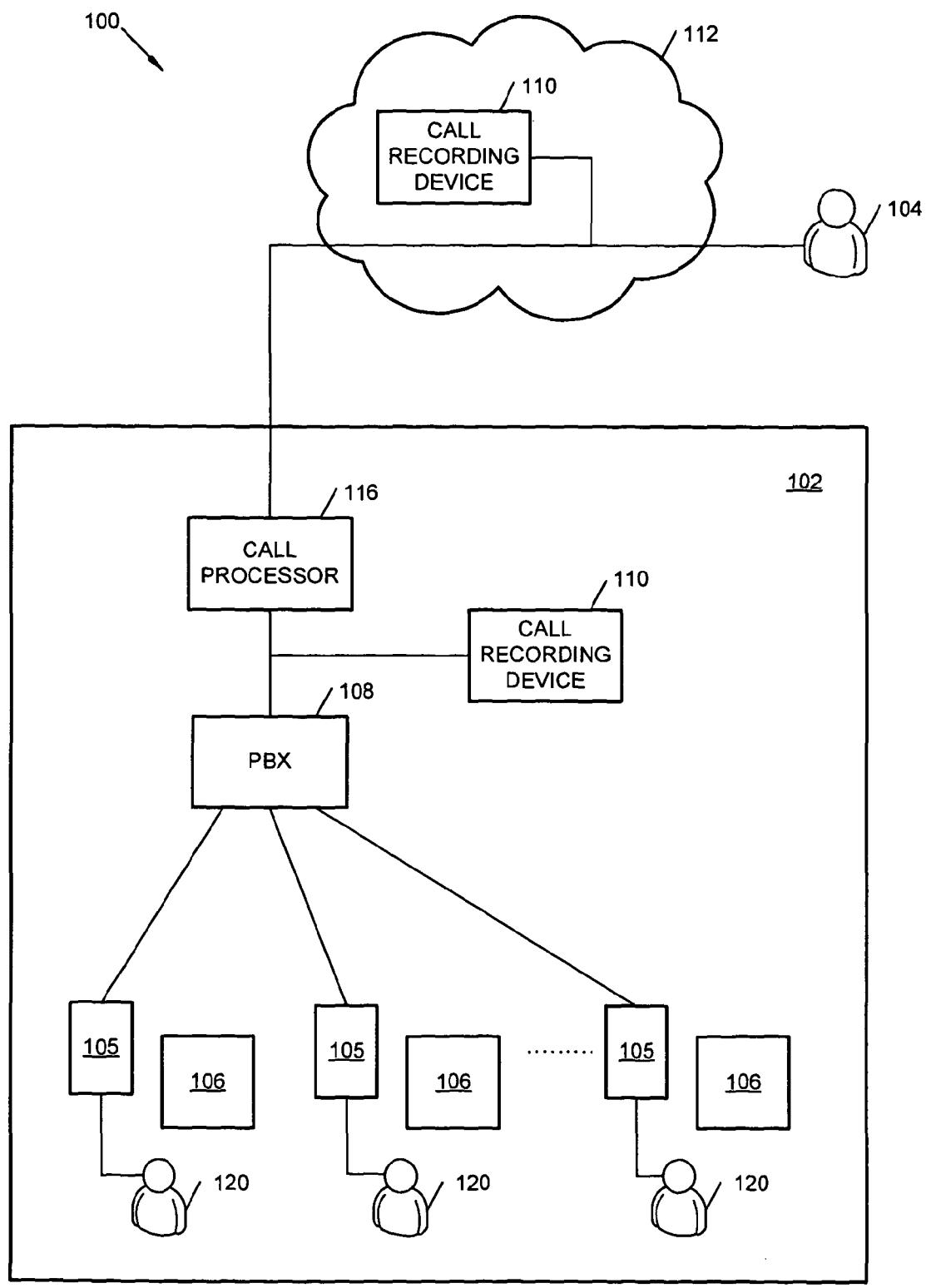

The invention generally relates to processing of data signals representing audio, in particular to prevent the recording and presentation of sensitive information during telephonic transactions.

BACKGROUND TO THE INVENTION

Call centres are extensively used by service providers in delivering services to, and communicating with, customers. Call centres typically comprise a large group of staff members taking or making telephone calls with customers. Call centres commonly implement two key pieces of technology to aid in staff training, customer complaint management, or record-keeping. These are call recording technologies, where an audio recording of the customer conversation is kept, and screen recording technologies, where a video or static snapshot of the staff member's computer terminal is kept.

Each year, millions of people telephone call centres to make service enquiries or financial transactions, or issue instructions to companies they deal with. In many cases, the customer is either required to confirm his identity by providing the answer to security-based questions, or to provide his credit card details to pay for a transaction. As will be appreciated, the nature of much of this information is highly sensitive. In particular, the information can include passwords, personally-identifiable information such as a date of birth, a PIN, a memorable phrase, bank account numbers, credit card security codes and the like.

Data and identity theft, as well as fraudulent financial transactions, are widespread, and so it is of particular interest to the caller to keep secret as much of the information as possible. Disclosing personally-sensitive financial or other security information to a call centre staff member has the potential to increase personal data loss in a number of ways. Firstly, the call centre staff member can write down the customer's information for later use. Secondly, anybody with access to an audio recording of the customer conversation can listen to the customer information and note it down. Thirdly, anybody with access to a screen recording taken at the time the customer's information appeared on a call centre staff member's computer screen could note it down. Fourthly, technology exists to automatically 'mine' audio and screen recordings for customer information, and data loss through this mode has the potential to be widespread.

As a result of these increasing security concerns, some governments have enshrined data storage security standards in law, and some industry bodies have enacted their own guidelines surrounding the storage of personal data. One example is the Payment Card Industry (PCI) Security Standards Council, which issues guidelines for the processing and storage of credit card data, globally. Their Data Security Standards (DSS), periodically updated, dictates the methods and ways in which companies processing credit card data (including telephone-based credit card transactions) can store card and personal data. Regulations and guidelines such as these have a direct impact on call centres which take customers' sensitive data in telephone conversations. For example, the DSS stipulates that the 3 or 4 digit Card Verification Value (CV2—sometimes also known as CVN, CW2, CVC2 or CID) not be stored in any format, including as encrypted audio recordings.

FIG. 1 schematically shows a prior art call centre operation 100. A call from customer 104 is routed over a network 112 to the call centre 102, where it is switched by private branch exchange (PBX) 108 to a phone 105 of one of a number of call centre agents 120 operating computer terminals 106. The incoming call is also branched off to a call recording device 110, which can be located at the call centre or at a telecom service provider in the network 112.

A known approach to improve the security of a customer's interaction with a call centre is to introduce a pause recording capability that can be invoked while the sensitive information is being spoken to the agent. The pause can be manually or automatically triggered, for example when the agent clicks on the CV2 field on his monitor to enter the caller's credit card security number. Alternatively, the agent can be bypassed by routing the call to an Interactive Voice Response (IVR) application (not shown in FIG. 1) when the sensitive information is required, which ensures that this part of the call is not recorded. However, in this mode, the agent and caller are disconnected from each other and are not able to talk freely throughout the card transaction. Another alternate method, turning off the recording, is not always practical, as most organisations carrying out credit card transactions need to record calls for staff training, investigating customer complaints, and in some circumstances to comply with industry or legal regulation such as those laid down by the Financial Services Authority (FSA).

Another known approach is to have callers use Dual-tone multi-frequency (DTMF) signalling. DTMF tones are typically produced by pressing the keys on a standard telephone, and are used for 'touch dialing'. In addition to its use for dialing, DTMF tones can communicate several alphanumeric characters clearly through a telephone's audio channel during a phone call. DTMF has the security advantage that it is impractical for a human to determine the alphanumeric equivalent of the DTMF tone simply by hearing the DTMF tone. Furthermore, it allows the call to continue as normal whilst the caller enters their credit card information using their phone keypad. However, the DTMF tones are representative of the sensitive information and so cannot be recorded if the DSS is to be complied with. To address this issue, it is known to introduce a call processor 116 at the call centre 102 that blocks DTMF tones.

For example, International Patent Application WO 2009/136163 (Semafone Limited) describes a telephone call processor with the capability to be switched between two modes: "normal" and "safe". In normal mode both voice and DTMF components are allowed to pass to the PBX. This is important for the operation of call centres, as DTMF tones are used frequently, to allow customers to operate and navigate through IVR menu selections, for example. In the safe mode the voice component of the call is allowed to pass to the agent whilst the DTMF component is blocked or masked. This means both the agent and the call recording do not 'hear' the DTMF data.

The process of switching between a 'normal' and 'safe' mode, however, can require a complex interaction between a call centre's phone system, its credit card payment processes and its agents' desktop computers. A need therefore exists for improved methods and apparatus that do not rely on invoking different operating states at different times during a call.

SUMMARY OF THE INVENTION

In one aspect of the invention there is provided a method of processing signals of a telephonic communication, the signals conveying sensitive and non-sensitive information, the method comprising processing the signals to provide a first version of the signals that is to be recorded and a second version of the signals that is to be output as audio; monitoring at least the first version of the signals to detect, in the at least the first version of the signals, one or more instances of one or more predetermined characteristics that represent the sensitive information conveyed by the signals; and modifying the at least the first version of the signals by removing the identified predetermined characteristics from the at least the first version of the signals.

The provision of first and second versions of the signals means that the need to invoke different operating states at different times during the communication can be avoided. In particular, the first and second versions of the signals can be handled separately from each other, so that monitoring and modifying of signals can be performed for substantially the entire telephonic communication and without any additional actions from the participants of the telephonic communication.

Examples of predetermined characteristics include, but are not limited to, waveform patterns such as Dual Tone Multiple Frequency tone patterns and voice patterns, and bit patterns such as data packet identifiers of, for example, VoIP packets.

In one embodiment, the method further comprises recording the first version of the signals at a call processor implementing the monitoring and the modifying. This allows the method to be performed at the point of recording.

In one embodiment, the method further comprises buffering the at least the first version of the signals, and wherein modifying the at least the first version of the signals comprises removing at least a portion of the buffered the at least the first version of the signals preceding a point of detection for each identified instance of the predetermined characteristics. This allows the modification of the monitored signals to compensate for the time interval associated with the detection of the predetermined characteristics. The portion can correspond to about up to about 50 milliseconds of audio information, for example between about 10 to 20 milliseconds of audio information.

In one embodiment the method further comprises determining an alphanumeric representation corresponding to each identified instance of the predetermined characteristics, and outputting data indicative of said alphanumeric representation for use by a software application. In this way, data representing the sensitive information can be automatically extracted without the involvement of the agent and output to a computer software application. The data can be formatted into a format suitable for the software application. Examples of alphanumeric representation include, but are not limited to phrases, words, letters, and numbers (individual or grouped).

In one embodiment, the method further comprises generating an emulated input device signal for the alphanumeric representation, and wherein the outputting of data comprises outputting the emulated input device signal. This allows data to be input directly into a software application.

In one embodiment, the method further comprises determining a target computer device from among a plurality of computer devices, the outputting comprising transmitting the data to the target computer device. In one embodiment, the target computer device is determined based on an IP address contained in the signals. Thus, the call processor can route incoming signals to a respective computer device, such as a computer terminal of a call centre agent.

In one embodiment, the software application resides on a computer device at a location remote from the call processor, the method further comprising encrypting the data.

In one embodiment, the method further comprises preventing a display of the alphanumeric representation by the software application. Such prevention can include instructing the software application to output a masked alphanumeric representation or generating a blank over a data entry field, for example.

In one embodiment, at least the monitoring and the modifying are applied to the second version of the signals (that are to be output as audio), the method further comprising outputting the modified second version of the signals. In this way, audio to an agent, for example, can be masked.

In another aspect of the invention there is provided a call processor for processing signals of a telephonic communication, the signals conveying sensitive and non-sensitive information, the call processor comprising means configured to receive a first version of the signals that is to be recorded, wherein said first version of the signals is one of at least two versions of the signals that include a second version of the signals that is to be output as audio; means configured to monitor at least the first version of the signals to detect, in the at least the first version of the signals, one or more instances of one or more predetermined characteristics that represent the sensitive information conveyed by the signals; and means configured to modify the at least the first version of the signals by removing the identified predetermined characteristics from the at least the first version of the signals.

In one embodiment the call processor further comprises means configured to record said first version of the signals.

In one embodiment, the call processor further comprises means configured to buffer the at least the first version of the signals, and wherein the means configured to modify the at least the first version of the signals is configured to remove at least a portion of the buffered the at least the first version of the signals preceding a point of detection for each identified instance of the predetermined characteristics.

In one embodiment, the call processor further comprises means configured to determine an alphanumeric representation corresponding to each identified instance of the predetermined characteristics, and means configured to output data indicative of said alphanumeric representation for use by a software application.

In one embodiment, the call processor further comprises means configured to generate an emulated input device signal for the alphanumeric representation, and wherein the means configured to output data is configured to output the emulated input device signal. The output can be a Universal Serial Bus (USB) interface or any other interface suitable for connecting to a personal computer.

In one embodiment, the call processor further comprises means configured to prevent a display of the alphanumeric representation by the software application.

In one embodiment, the call processor further comprises means configured to determine a target computer device from among a plurality of computer devices, said outputting comprising transmitting the data to said target computer device. In one embodiment, the target computer device is determined based on an IP address contained in the signals.

In one embodiment, the software application resides on a computer device at a location remote from the call processor, the call processor further comprising means configured to encrypt the data.

In one embodiment, the call processor further comprises means configured to output the modified second version of the signals.

In another aspect of the invention there is provided a method of processing signals of a telephonic communication, the signals conveying sensitive and non-sensitive information, the method comprising buffering the signals; monitoring the signals to detect, in the signals, one or more instances of one or more predetermined characteristics that represent the sensitive information conveyed by the signals; and modifying the buffered signals by removing the identified predetermined characteristics.

As described previously, buffering the signals allows the modification to compensate for the small time period associated with the detection of the predetermined characteristics. In this way the method can be implemented as a standalone method, for example at already existing recording devices such as a call recording server. Thus in one embodiment, modifying the buffered signals comprises removing at least a portion of the buffered signals preceding a point of detection for each identified instance of the predetermined characteristics.

In one embodiment, the method further comprises recording the modified signals.

In another aspect of the invention there is provided a call processor for processing signals of a telephonic communication, the signals conveying sensitive and non-sensitive information, the call processor comprising means configured to buffer the signals; means configured to monitor the signals to detect, in the signals, one or more instances of one or more predetermined characteristics that represent the sensitive information conveyed by the signals; and means configured to modify the buffered signals by removing the identified predetermined characteristics.

In one embodiment, the means configured to modify the buffered signals is configured to modify the buffered signals by removing at least a portion of the buffered signals preceding a point of detection for each identified instance of the predetermined characteristics.

In one embodiment, the call processor further comprises means configured to record the modified signals.

In another aspect of the invention there is provided a method of processing signals of a telephonic communication, the signals conveying sensitive and non-sensitive information, the method comprising processing the signals to provide a first version of the signals that is to be recorded and a second version of the signals from which information is to be extracted; at a first location: monitoring said first version of the signals to detect, in the first version of the signals, one or more instances of one or more predetermined characteristics that represent the sensitive information conveyed by the signals; modifying said first version of the signals by removing the identified predetermined characteristics from said first version of the signals; and outputting the modified first version of the signals for recording; and at one or more second locations: monitoring said second version of the signals to detect, in the second version of the signals, one or more instances of one or more predetermined characteristics that represent the sensitive information conveyed by the signals; determining an alphanumeric representation corresponding to each identified instance of the predetermined characteristics; and outputting data indicative of said alphanumeric representation for use by a software application.

Thus this method facilitates recording at a first location and data extraction at a second location, for example at a central server and an agent station of a call centre, respectively.

In one embodiment, the method further comprises, at the first location, buffering the first version of the signals, and wherein modifying the first version of the signals comprises removing at least a portion of the buffered first version of the signals preceding a point of detection for each identified instance of the predetermined characteristics.

In one embodiment, the method further comprises recording the first version of the signals at the first location.

In one embodiment, the method further comprises, at the one or more second locations, preventing a display of said alphanumeric representation by the software application.

In one embodiment, the method further comprises, at the one or more second locations, modifying the second version of the signals by removing the identified predetermined characteristics from the second version of the signals, and outputting the second version of the signals for hearing.

In one embodiment, the method further comprises, at the one or more second locations, generating an emulated input device signal for said alphanumeric representation, and wherein the outputting of data comprises outputting the emulated input device signal.

In another aspect of the invention there is provided a call processor for processing signals of a telephonic communication, the signals conveying sensitive and non-sensitive information, the call processor comprising a first means at a first location comprising: receiving means configured to receive a first version of the signals; monitoring means configured to monitor said first version of the signals to detect, in the first version of the signals, one or more instances of one or more predetermined characteristics that represent the sensitive information conveyed by the signals; modifying means for modifying said first version of the signals by removing the identified predetermined characteristics from said first version of the signals; and outputting means for outputting the modified first version of the signals for recording; and a second means at one or more second locations comprising: receiving means configured to receive a second version of the signals; monitoring means configured to monitor said second version of the signals to detect, in the second version of the signals, one or more instances of one or more predetermined characteristics that represent the sensitive information conveyed by the signals; determining means configured to determine an alphanumeric representation corresponding to each identified instance of the predetermined characteristics; and outputting means configured to output data indicative of said alphanumeric representation for use by a software application.

In one embodiment, the first means further comprises buffering means configured to buffer the first version of the signals, and wherein the modifying means is configured to remove at least a portion of the buffered first version of the signals preceding a point of detection for each identified instance of the predetermined characteristics In one embodiment, the first means further comprises means configured to record the first version of the signals.

In one embodiment, the second means further comprises preventing means configured to prevent a display of said alphanumeric representation by the software application.

In one embodiment, the second means further comprises modifying means configured to modify the second version of the signals by removing the identified predetermined characteristics from the second version of the signals, and outputting means configured to output the second version of the signals for hearing.

In one embodiment, the second means further comprises generating means configured to generate an emulated input device signal for the alphanumeric representation, and wherein the outputting means configured to output data is configured to output the emulated input device signal.

In another aspect of the invention there is provided a method of processing signals of a telephonic communication, the signals conveying sensitive and non-sensitive information, the method comprising receiving the signals; monitoring the received signals to detect, in said signals, one or more instances of one or more predetermined characteristics that represent the sensitive information; determining an alphanumeric representation corresponding to each identified instance of the predetermined characteristics; generating an emulated input device signal for each alphanumeric representation; and outputting said emulated input device signal for use by a software application, the outputting comprising performing a validation check to ensure that the emulated input device signal is entered into a validated data entry field of a validated software application.

The emulation of an input device signal means that the extracted data can be conveyed to the software application in a format that is readily recognizable. By performing a validation check to determine that the emulated input device signal is entered to the expected data entry location within the expected software application, the entry of emulated input device signal to unexpected data entry locations can be denied. This may include determining the current 'window title' of a software application, determining the current data entry field title, inspection of a data entry field's properties, determining any other application-specific property, or determining any other on-screen information. The methods for performing validation checking could include API communication, inspection of a web page's html content or document object model or any similar or related communication required to interact with the software application. In this way, validation checks can, for example, determine whether the 'display as asterisks' (*) property of an on-screen display field has been enabled, or whether the number of characters which can be entered into the data entry field corresponds with the length of the alphanumeric representation. In so doing, agents can be prevented, for example, from using the emulated input device signal to enter sensitive card details into a separate location from where they can be stolen.

In one embodiment, the method further comprises modifying the received signals by removing the identified predetermined characteristics from said received signals, and outputting the modified signals for hearing.

In one embodiment, the method further comprises preventing a display of the alphanumeric representation by the software application.

In one embodiment, the outputting of the emulated input device signal comprises entering the emulated input device signal as data into a validated data entry field of the software application.

It will be appreciated that the preventing of a display of the alphanumeric representation and the entering of the emulated input device signal into a validated data entry field are just two of many interactions or commands which can be implemented in order to control the use or application of the extracted data.

In another aspect of the invention there is provided a call processor for processing signals of a telephonic communication, the signals conveying sensitive and non-sensitive information, the call processor comprising means configured to receive the signals; means configured to monitor said signals to detect, in said signals, one or more instances of one or more predetermined characteristics that represent the sensitive information; means configured to determine an alphanumeric representation corresponding to each identified instance of the predetermined characteristics; means configured to generate an emulated input device signal for each alphanumeric representation; means configured to output said emulated input device signal for use by a software application; and means configured to perform a validation check to ensure that the emulated input device signal is entered into a validated data entry field of a validated software application.

Such a call processor can be easily introduced into existing infrastructures, for example either as software or hardware at a computer terminal. Thus, the call processor can output signals to a computer terminal by means of a USB or other suitable interface.

In one embodiment, the call processor further comprises means configured to modify said received signals by removing the identified predetermined characteristics from said received signals, and means configured to output said received signals for hearing.

In one embodiment, the call processor further comprises preventing means configured to prevent a display of the alphanumeric representation by the software application.

In another aspect of the invention there is provided a method of processing signals of a telephonic communication by a call processor, the signals conveying sensitive and non-sensitive information, the method comprising receiving the signals; monitoring the received signals to detect, in the signals, one or more instances of one or more predetermined characteristics that represent the sensitive information conveyed by the signals; determining an alphanumeric representation corresponding to each identified instance of the predetermined characteristics; generating data indicative of the alphanumeric representation; determining a target computer device from among a plurality of computer devices; and outputting the data for use by a software application executable on the target computer device.

In one embodiment, the method further comprises modifying the received signals by removing the identified predetermined characteristics from the received signals, and outputting the modified signals for recording.

In one embodiment, the data comprises an emulated input device signal generated for each alphanumeric representation.

In one embodiment, the method further comprises entering the emulated input device signal as data into a validated data entry field of the software application.

In one embodiment, the method further comprises preventing a display of the alphanumeric representation by the software application.

In one embodiment, the target computer device is determined based on an IP address contained in the signals.

In another aspect of the invention there is provided a call processor for processing signals of a telephonic communication, the signals conveying sensitive and non-sensitive information, the call processor comprising means configured to receive the signals; means configured to monitor the signals to detect, in the signals, one or more instances of one or more predetermined characteristics that represent the sensitive information; means configured to determine an alphanumeric representation corresponding to each identified instance of the predetermined characteristics; means configured to generate data indicative of the alphanumeric representation; means configured to determine a target computer device from among a plurality of computer devices; and means configured to output the data for use by a software application executable on the target computer device.

In one embodiment, the call processor further comprises means configured to modify the received signals by removing the identified predetermined characteristics from the received signals, and means configured to output the modified signals for recording.

In one embodiment, the data comprises an emulated input device signal generated for each alphanumeric representation.

In one embodiment, the call processor further comprises means configured to enter the emulated input device signal as data into a validated data entry field of the software application.

In one embodiment, the call processor further comprises means configured to prevent a display of the alphanumeric representation by the software application.

In one embodiment, the means configured to determine a target computer device is configured to determine the target computer device based on an IP address contained in the signals.

In another aspect of the invention there is provided a method of processing signals of a telephonic communication by a call processor at a first location, the signals conveying sensitive and non-sensitive information, the method comprising receiving the signals; monitoring the received signals to detect, in the signals, one or more instances of one or more predetermined characteristics that represent the sensitive information conveyed by the signals; generating data indicative of the alphanumeric representation; encrypting the data; and outputting the encrypted data for transmission over a network to a computer device at a second location.

In one embodiment, the method further comprises modifying the received signals by removing the identified predetermined characteristics from the received signals, and outputting the modified signals for recording.

In one embodiment, the encrypted data is transmitted via a computer device at the first location.

In one embodiment, the method further comprises receiving a message from the computer device at the second location indicating whether or not the encrypted data was successfully processed by the software application.

In another aspect of the invention there is provided a call processor for processing signals of a telephonic communication, the signals conveying sensitive and non-sensitive information, the call processor located at a first location, the call processor comprising means configured to receive the signals; means configured to monitor the signals to detect, in the signals, one or more instances of one or more predetermined characteristics that represent the sensitive information; means configured to generate data indicative of the alphanumeric representation; means configured to encrypt the data; and means configured to output the encrypted data for transmission over a network to a computer device at a second location.

In one embodiment, the call processor further comprises means configured to modify said received signals by removing the identified predetermined characteristics from said received signals, and means configured to output the modified signals for recording.

In one embodiment, the transmission is carried out via a computer device at the first location.

In one embodiment, the call processor further comprises means configured to receive a message from the computer device at the second location indicating whether or not the encrypted data was successfully processed by the software application.

In another aspect of the invention there is provided a method of conducting a transaction, the method comprising establishing a telephonic communication between a customer and a call centre agent, the telephonic communication comprising signals conveying sensitive and non-sensitive information of the customer; processing the signals to provide a first version of the signals that is to be recorded and a second version of the signals that is to be output as audio to the call centre agent; monitoring, by a call processor, at least the first version of the signals to detect, in the at least the first version of the signals, one or more instances of one or more predetermined characteristics that represent the sensitive customer information conveyed by the signals; modifying, by the call processor, the at least the first version of the signals by removing the identified predetermined characteristics from the at least the first version of the signals; and processing the transaction by a software application executing on a computing device, using the sensitive information conveyed in the signals.

In one embodiment, the method further comprises determining, by the call processor, an alphanumeric representation corresponding to each identified instance of the predetermined characteristics; generating, by the call processor, data indicative of the alphanumeric representation; and outputting, by the call processor, the data for use by the software application to process the transaction.

In one embodiment, the data comprises an emulated input device signal for each alphanumeric representation.

In one embodiment, the method further comprises identifying, by the call processor, the computing device from among a plurality of computing devices.

In one embodiment, the determining is based on an IP address contained in the signals.

In one embodiment, the method further comprises encrypting, by the call processor, the data; and wherein the outputting comprises outputting the encrypted data for transmission over a network to a computing device at a location remote from the call centre.

The present invention and any of its embodiments can be implemented by software on a general purpose computer or in a combination of software and hardware. Thus any of the 'means' defined above can be implemented as code modules in any combination in a computer.

In one embodiment of the invention there is provided a computer program product which may be embodied in a passive storage medium, and which configures a computer to perform a method defined in any one of the paragraphs above. Here, the term computer may encompass a computer with dedicated hardware.

Aspects of the invention may be provided in the form of a computer program product on a carrier medium, which may be embodied in a passive storage medium such as an optical or magnetic medium, or in an electronic medium such as a mass storage device (e.g. a FLASH memory), or in a hardware device implemented to achieve execution of instructions in accordance with the invention, such as ASIC, an FPGA, a DSP, a RISC microcontroller or the like. Alternatively the carrier medium can comprise a signal carrying the computer program code such as an optical signal, an electrical signal, an electromagnetic signal, an acoustic signal or a magnetic signal. For example, the signal can comprise a TCP/IP signal carrying the code over the Internet.

As used herein, the term "telephonic communication" generally refers to the transmission of information over a communication channel, which includes wired and wireless communications channels (or both), and encompasses packet-based communications such as VoIP.

As used herein, the term "version" is generally used to describe a particular instance of the signals that convey substantially the same information content as other instances of the signals.

The methods and apparatus can be readily utilised in call centre operations, for example at an agent station comprising an agent audio telephonic communication arrangement (e.g. phone and/or phone headset/handset) and an agent computer system, or at a call recording server, or a combination thereof.

However, it will be appreciated that the disclosure is applicable to other applications that perform recording and data extraction.

BRIEF DESCRIPTION OF THE EMBODIMENTS

Figure 2:
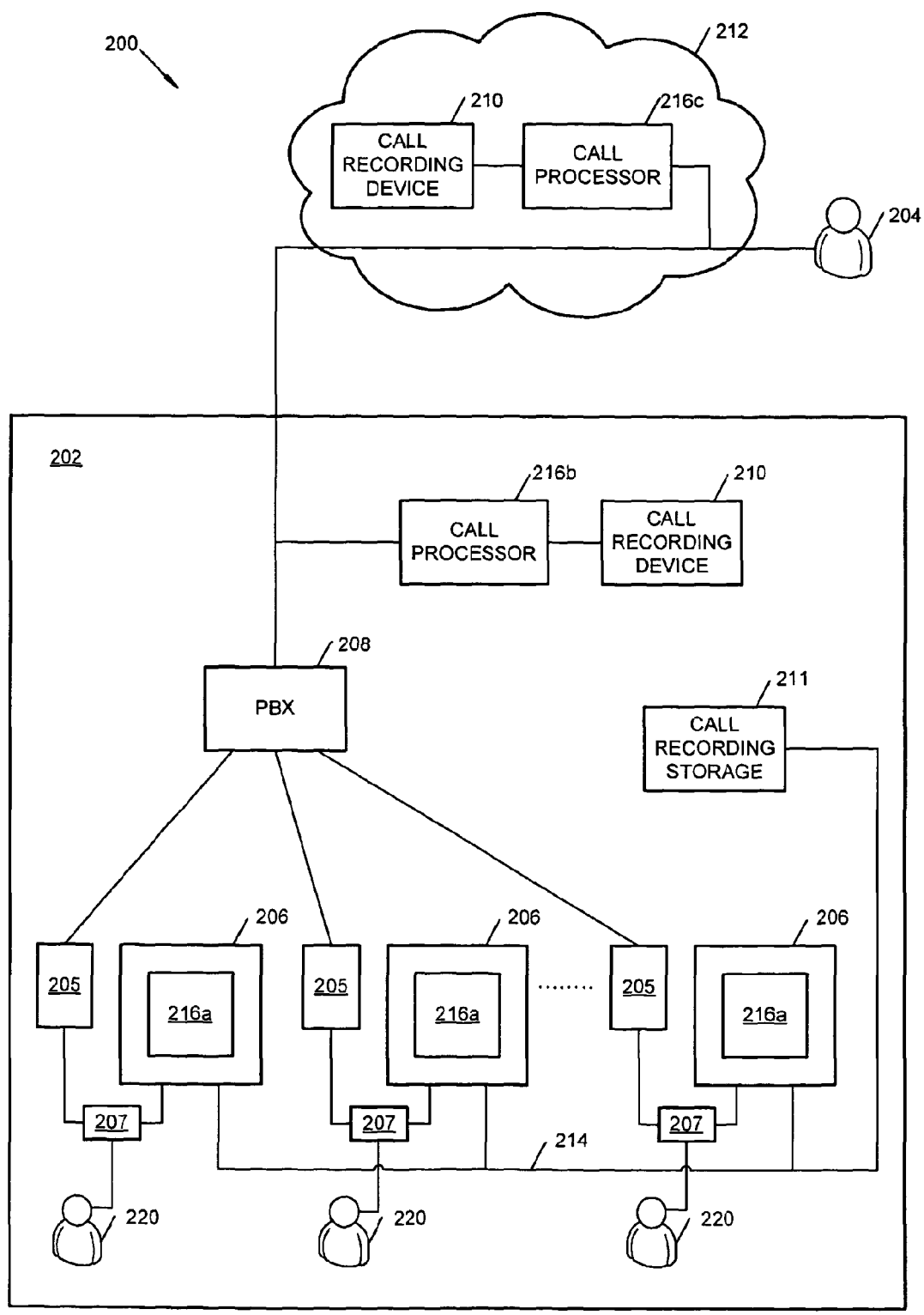
Figure 3:
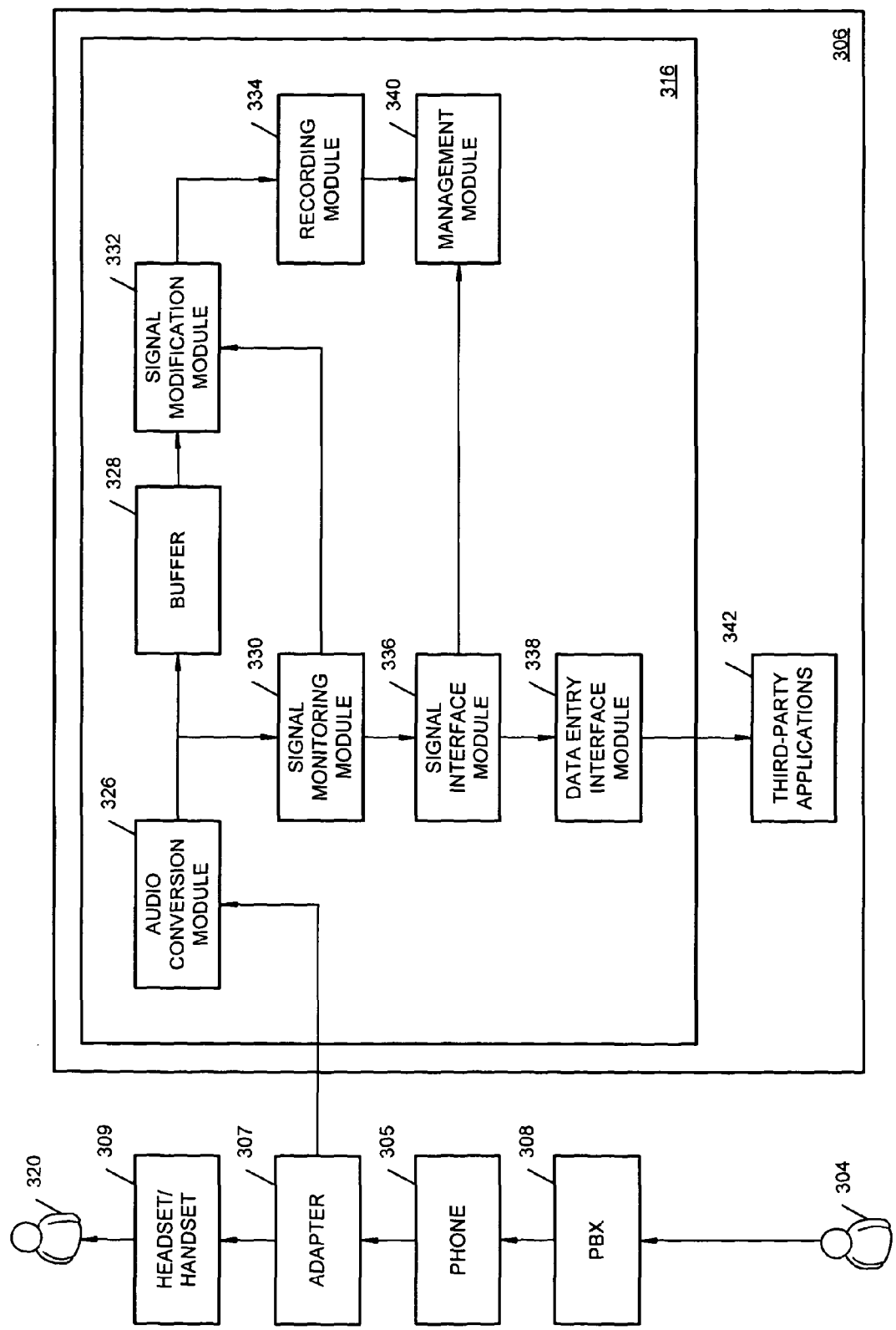
Figure 4:
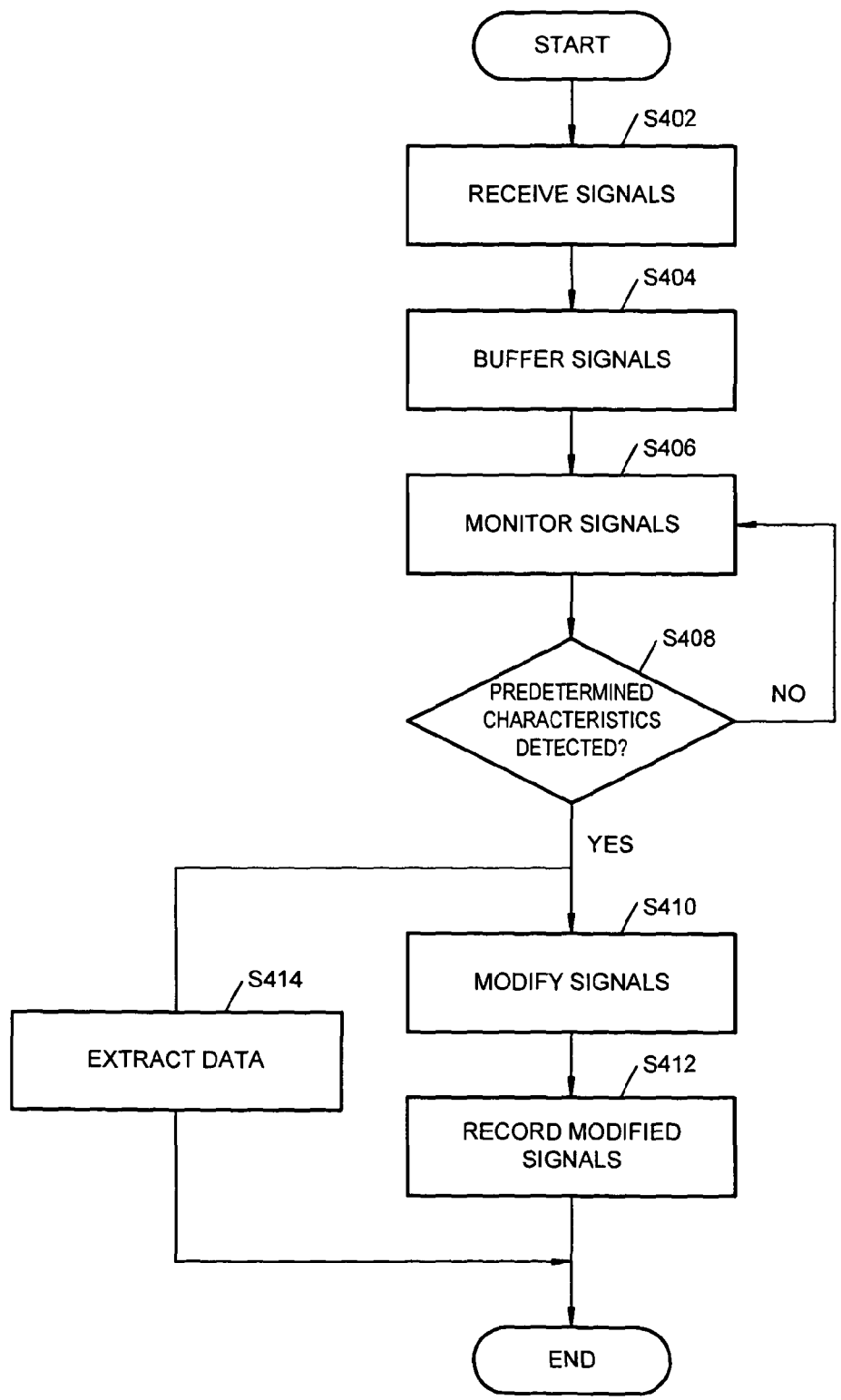
Figure 5:
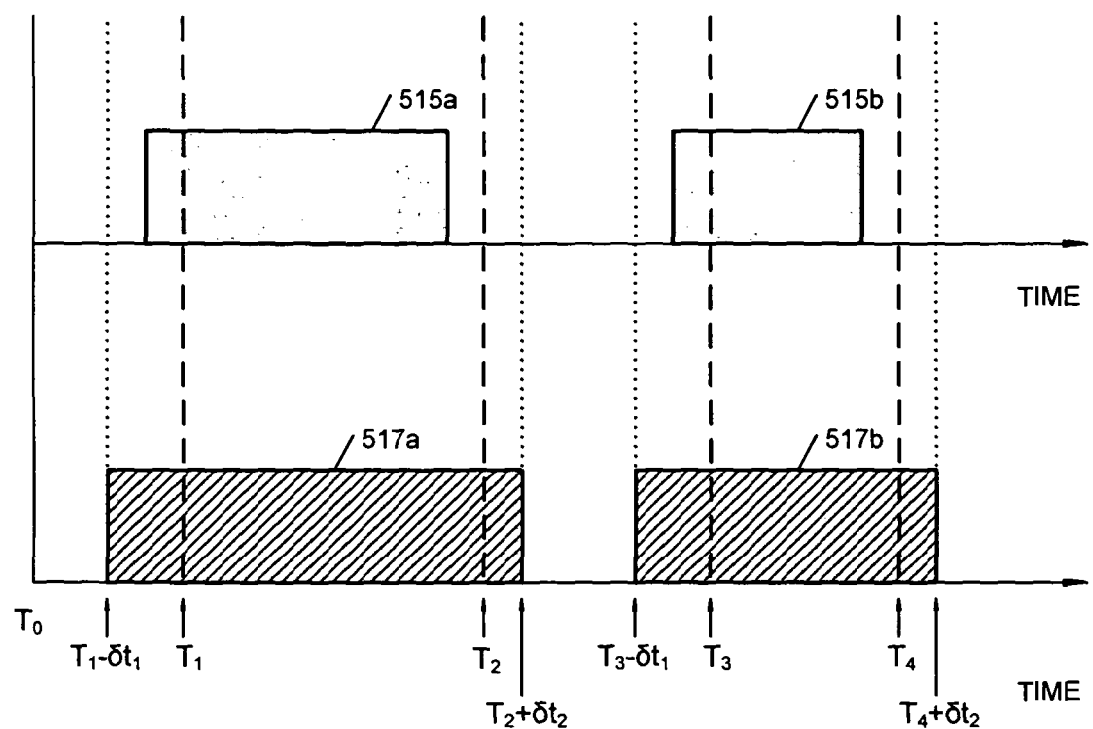
Figure 6:
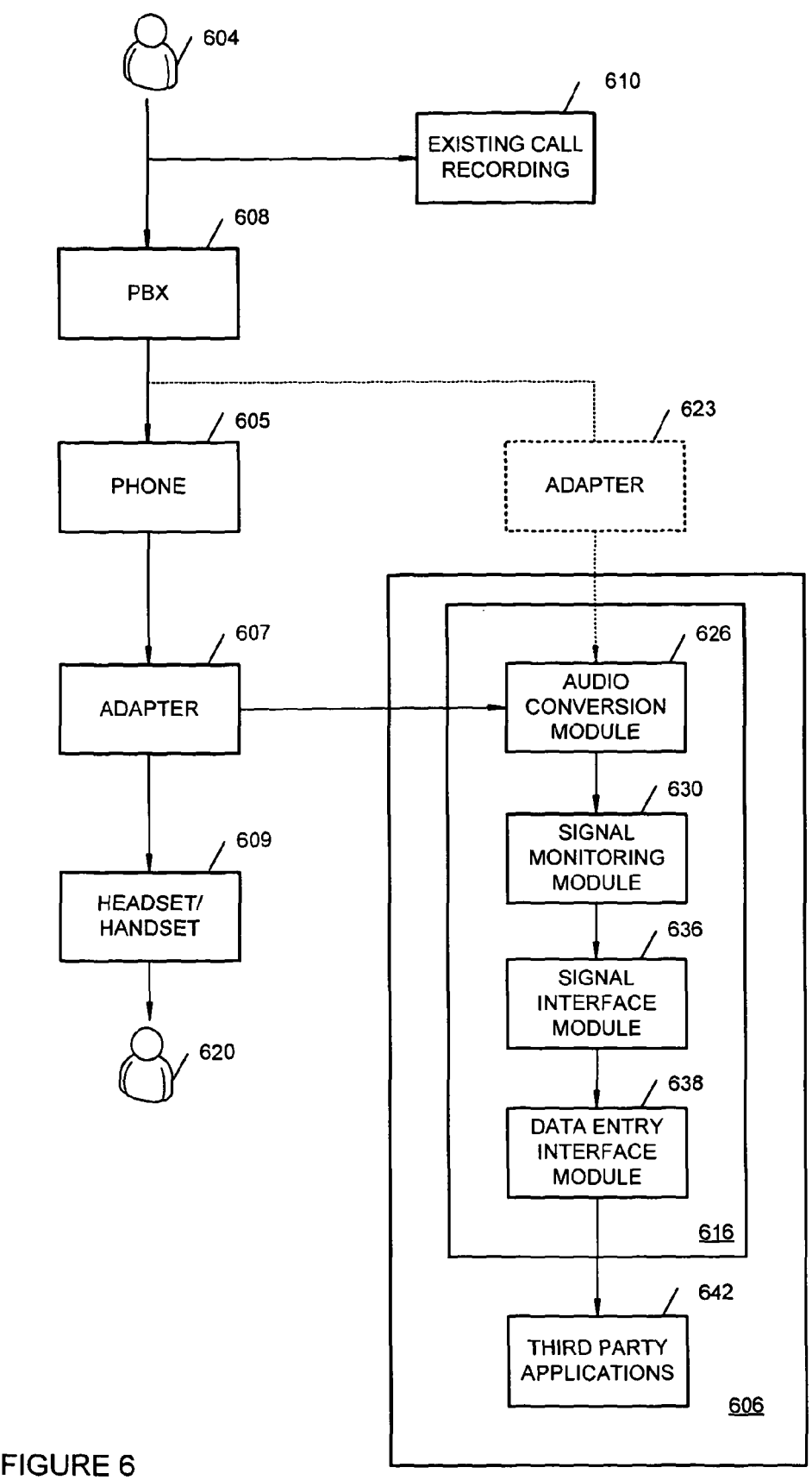
Figure 7:
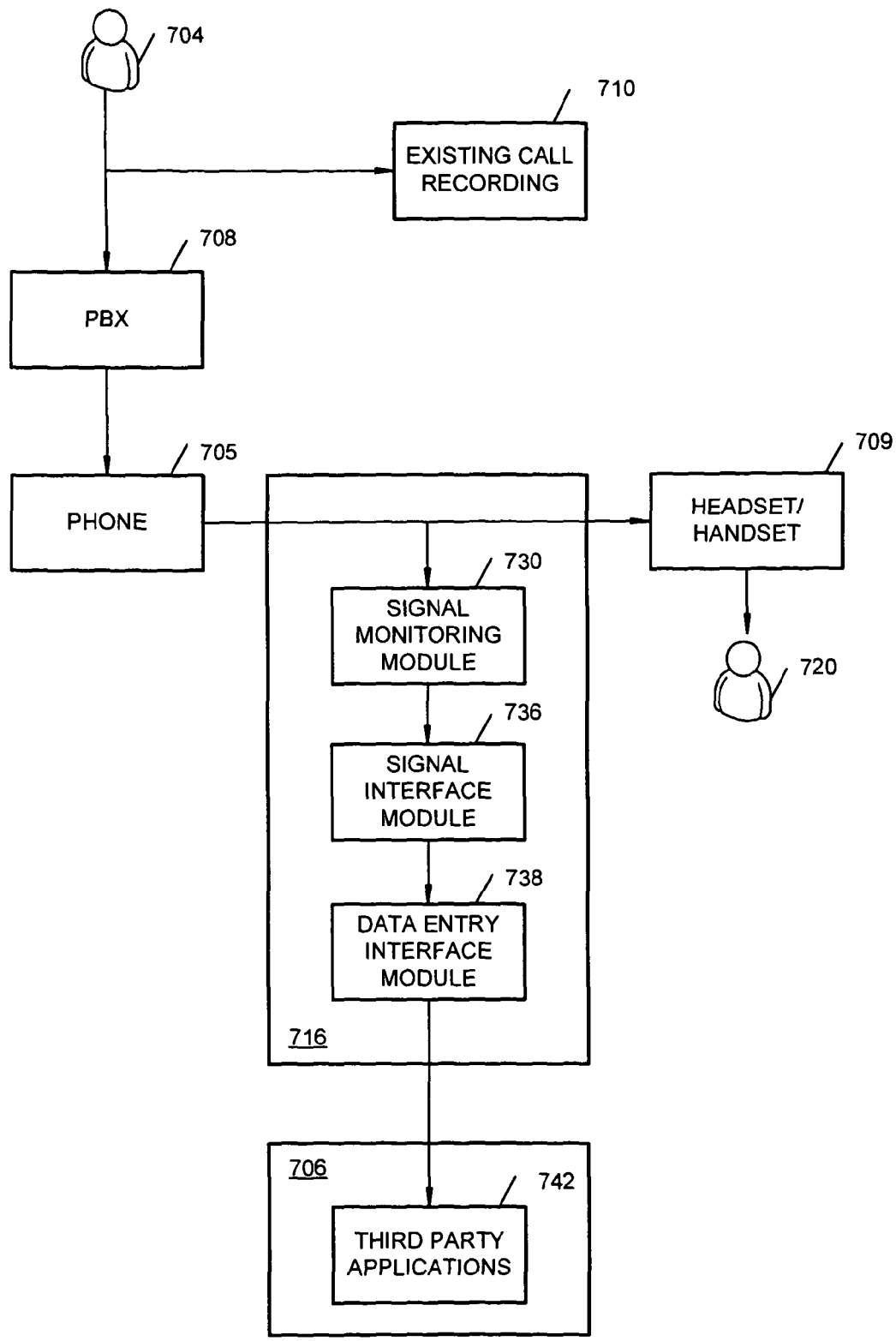
Figure 8:
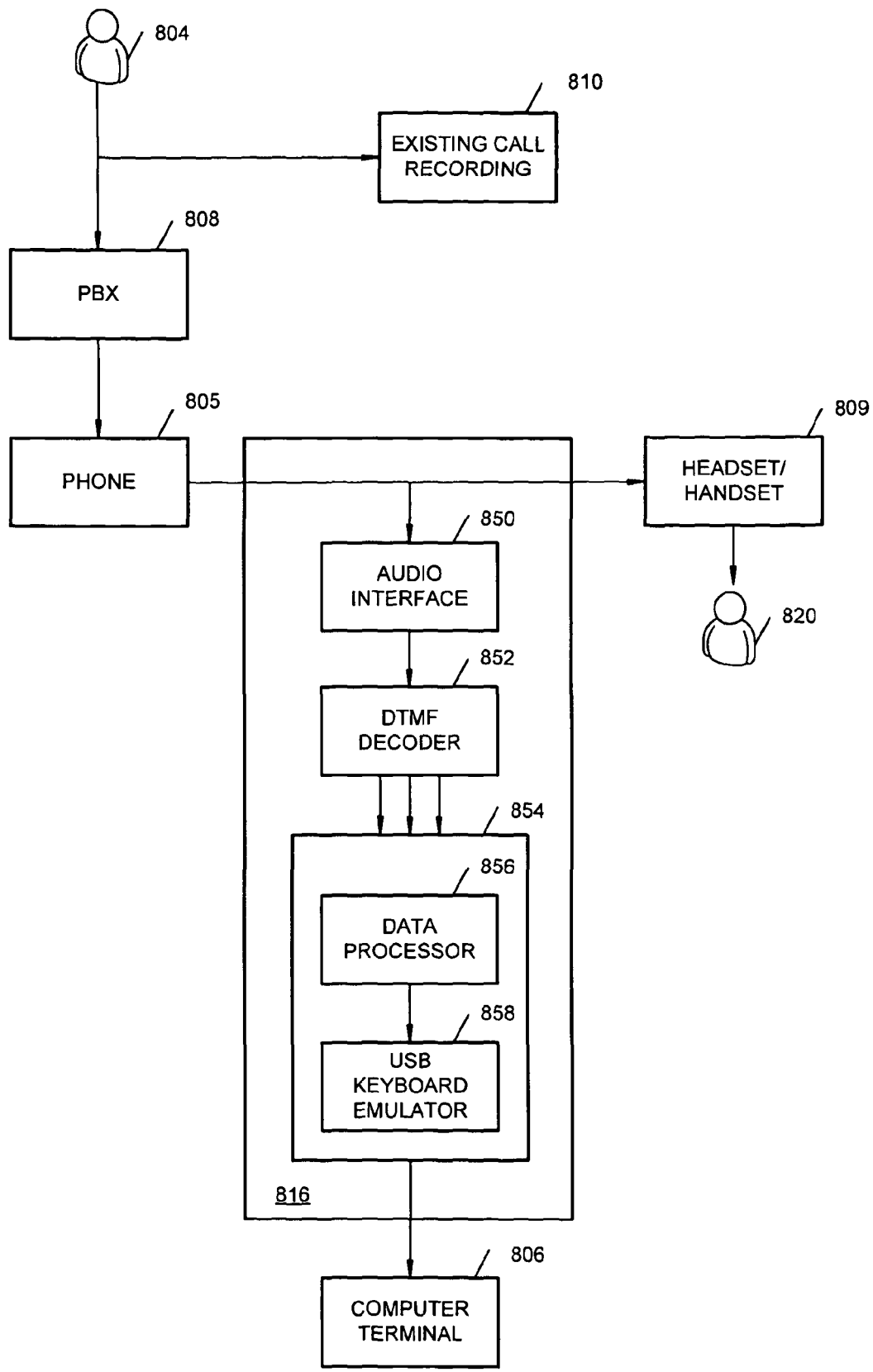
Figure 9:
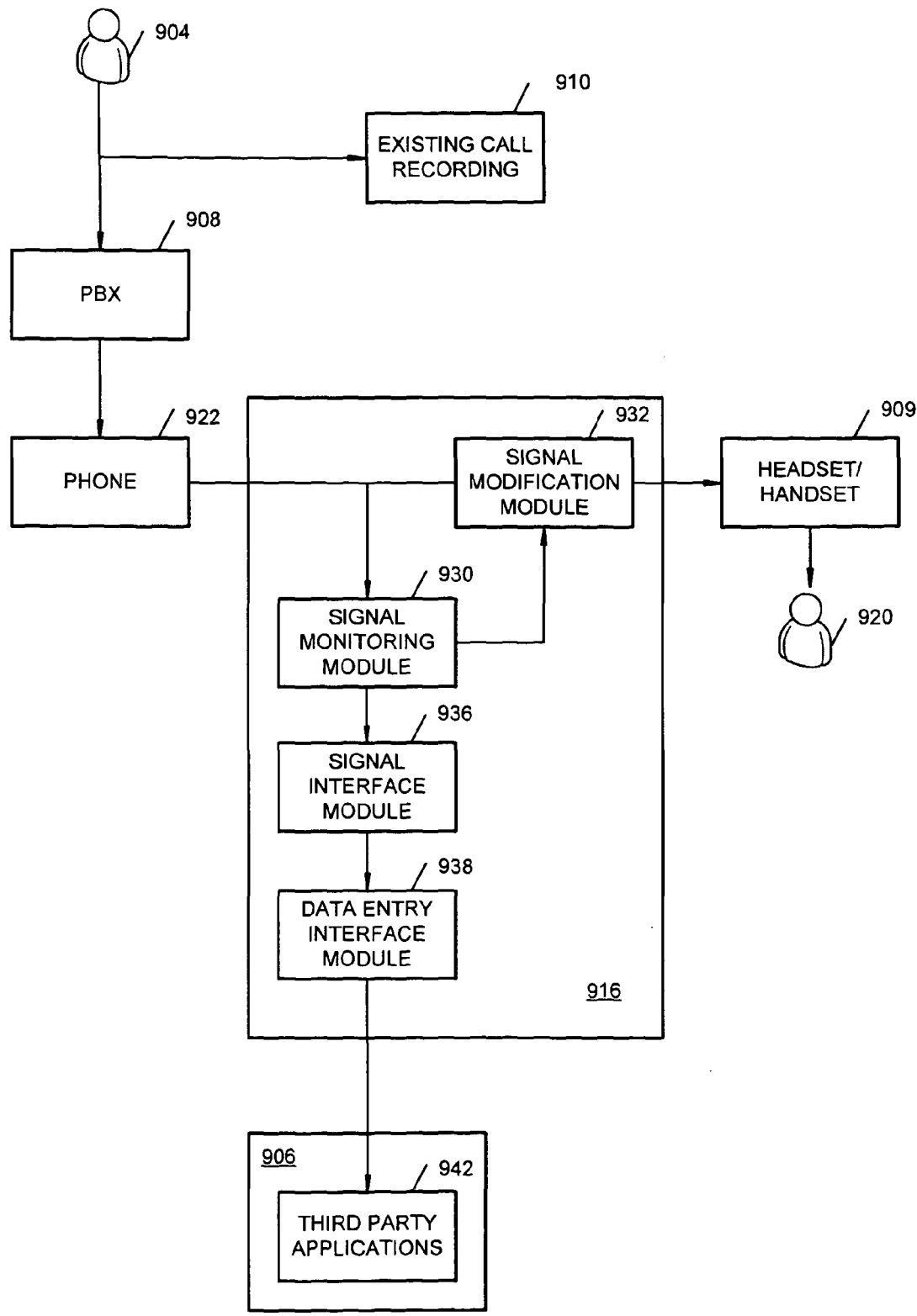
Figure 10:
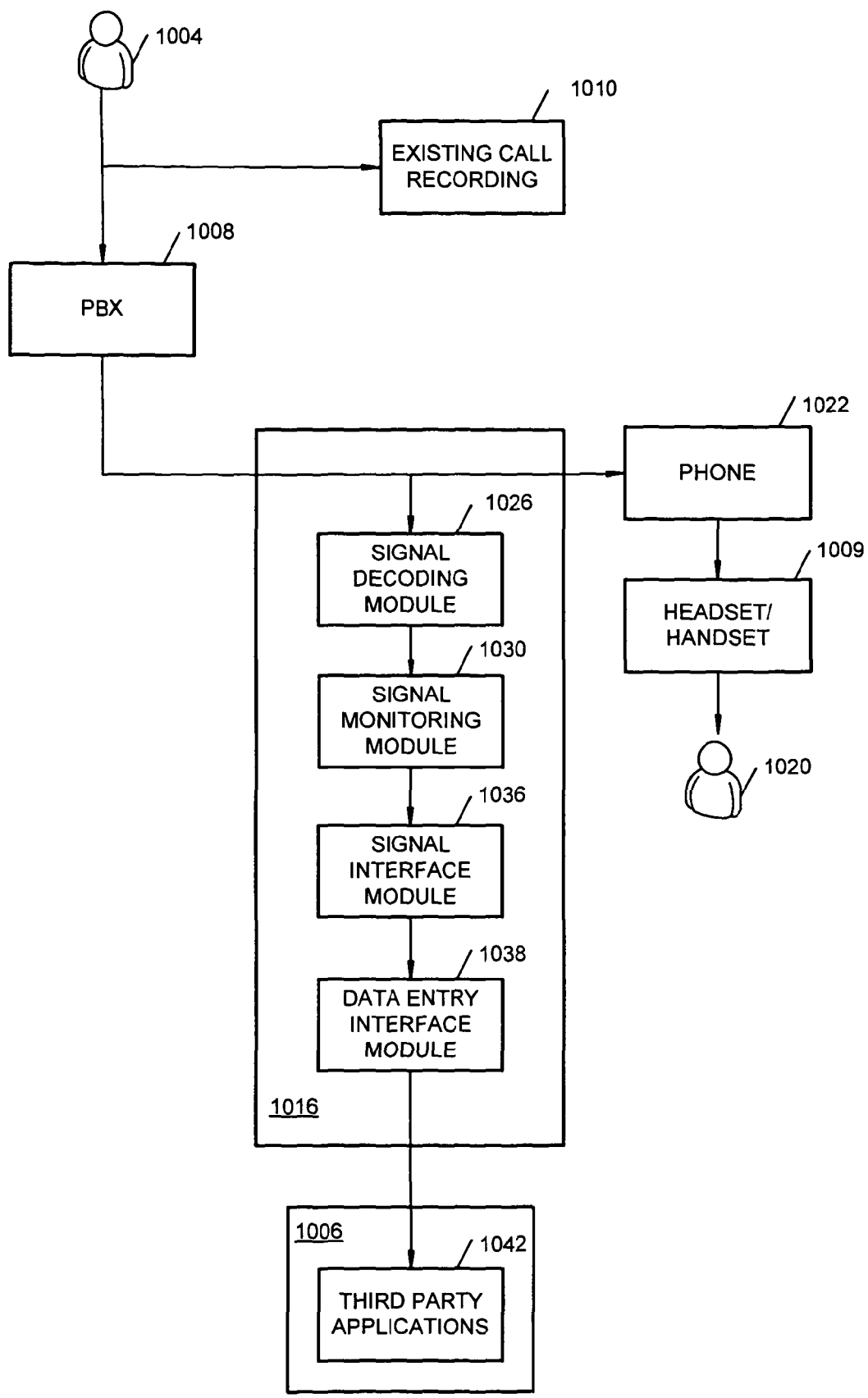
Figure 11:
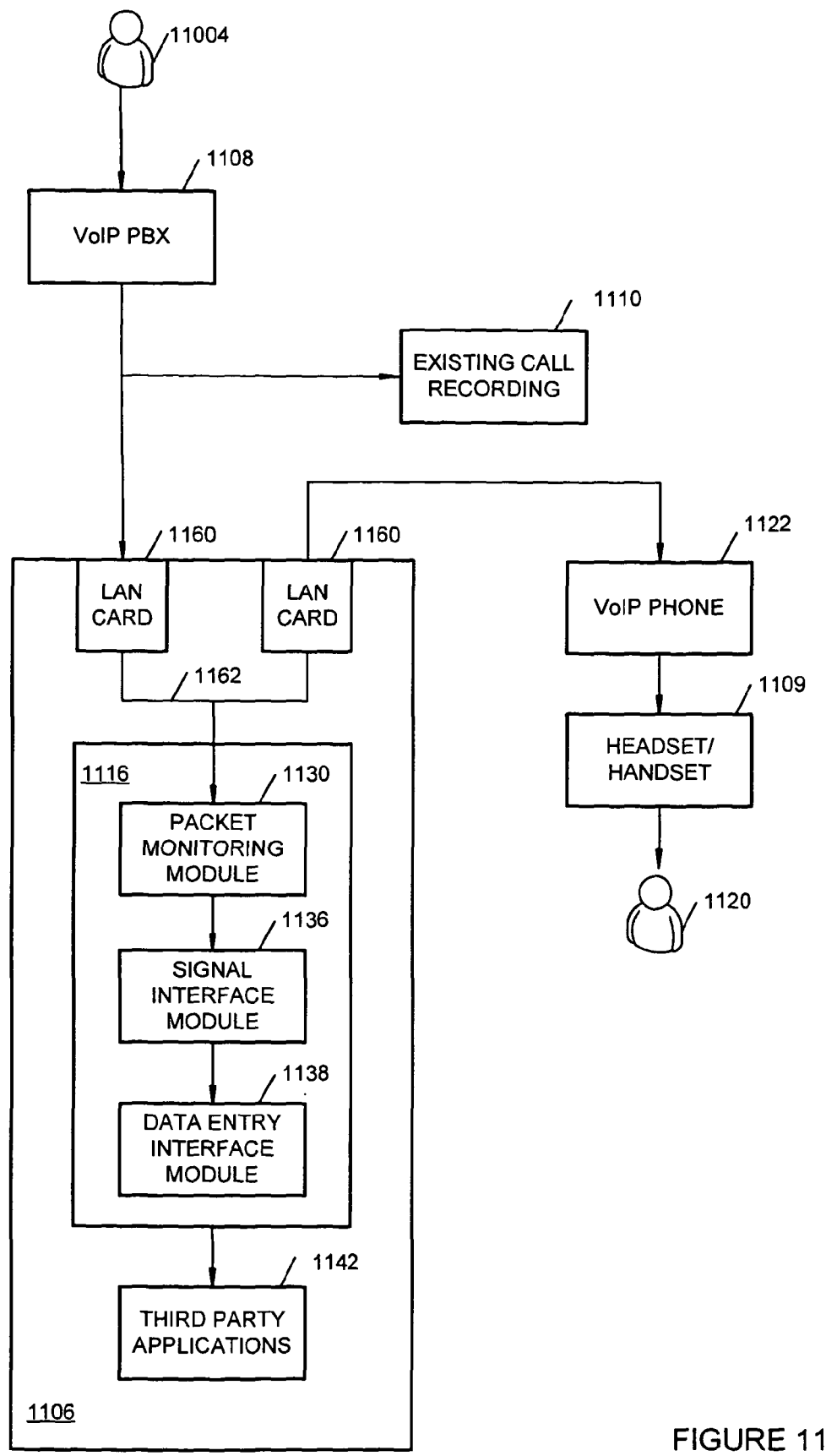
Figure 12:
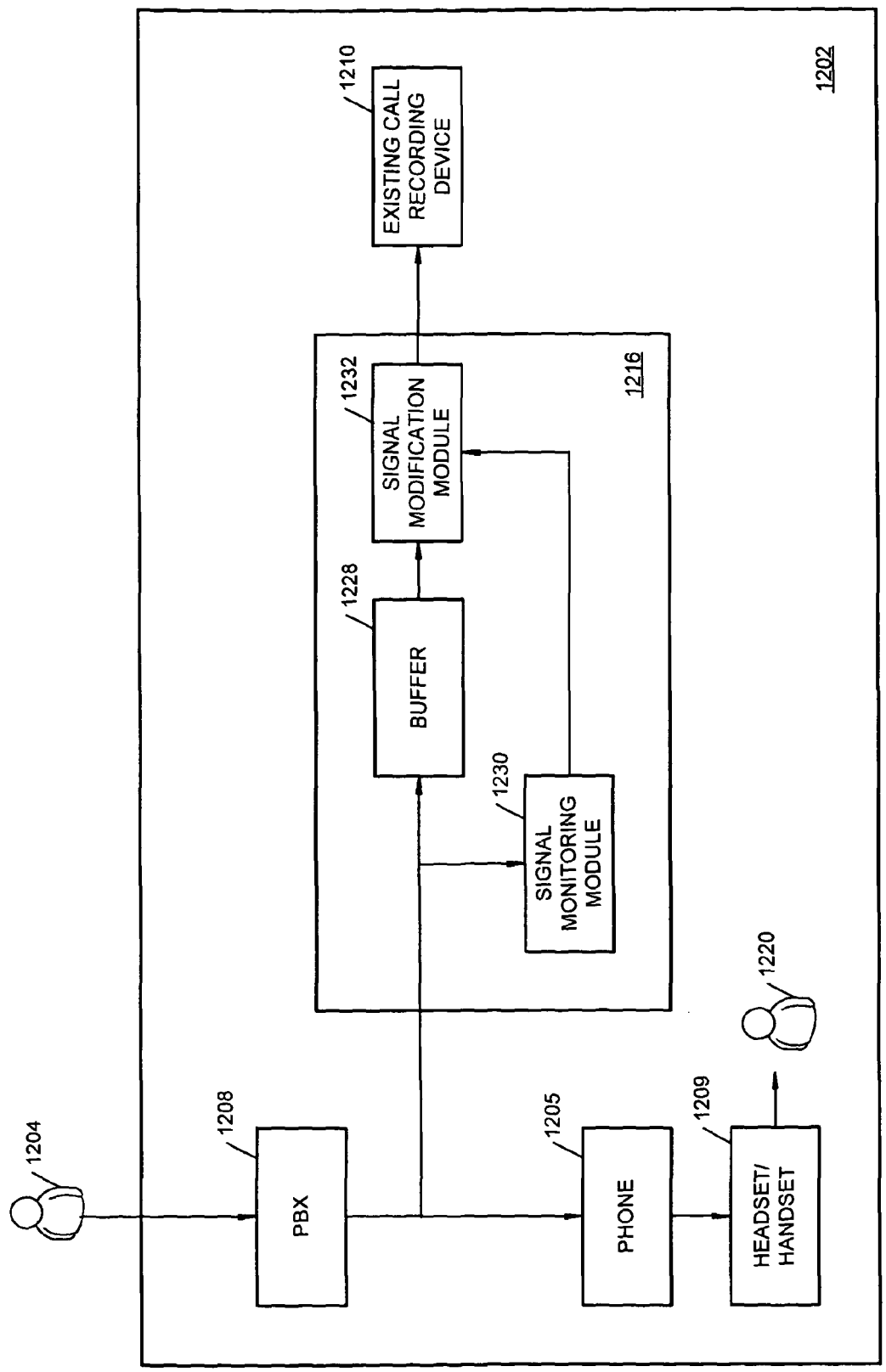

Further aspects, features and advantages of the invention will become apparent to the reader of the following description of specific embodiments of the invention, provided by way of example only, with reference to the accompanying drawings, in which:

FIG. 1 schematically shows a known call centre operation;

FIG. 2 schematically shows a call centre operation employing call processors in accordance with embodiments of the invention;

FIG. 3 schematically shows a call processor in accordance with an embodiment of the invention in which signal modification and data extraction is implemented as software in a computer terminal;

FIG. 4 schematically shows a flow diagram of a process of processing data signals in accordance with an embodiment of the invention;

FIG. 5 schematically shows the detection and signal modification in accordance with an embodiment of the invention;

FIG. 6 schematically shows a call processor in accordance with an embodiment of the invention in which data extraction is implemented as software;

FIG. 7 schematically shows a call processor in accordance with an embodiment of the invention in which data extraction is implemented as hardware;

FIG. 8 schematically shows a call processor in accordance with an embodiment of the invention in which data extraction is implemented as hardware;

FIG. 9 schematically shows a call processor in accordance with an embodiment of the invention in which signal modification and data extraction is implemented as hardware;

FIG. 10 schematically shows a call processor in accordance with an embodiment of the invention in which data extraction is implemented as hardware;

FIG. 11 schematically shows a call processor in accordance with an embodiment of the invention in which data extraction is implemented in a computer terminal;

FIG. 12 schematically shows a call processor in accordance with an embodiment of the invention in which signal modification is performed at or near a call recording device.

Figure 13:
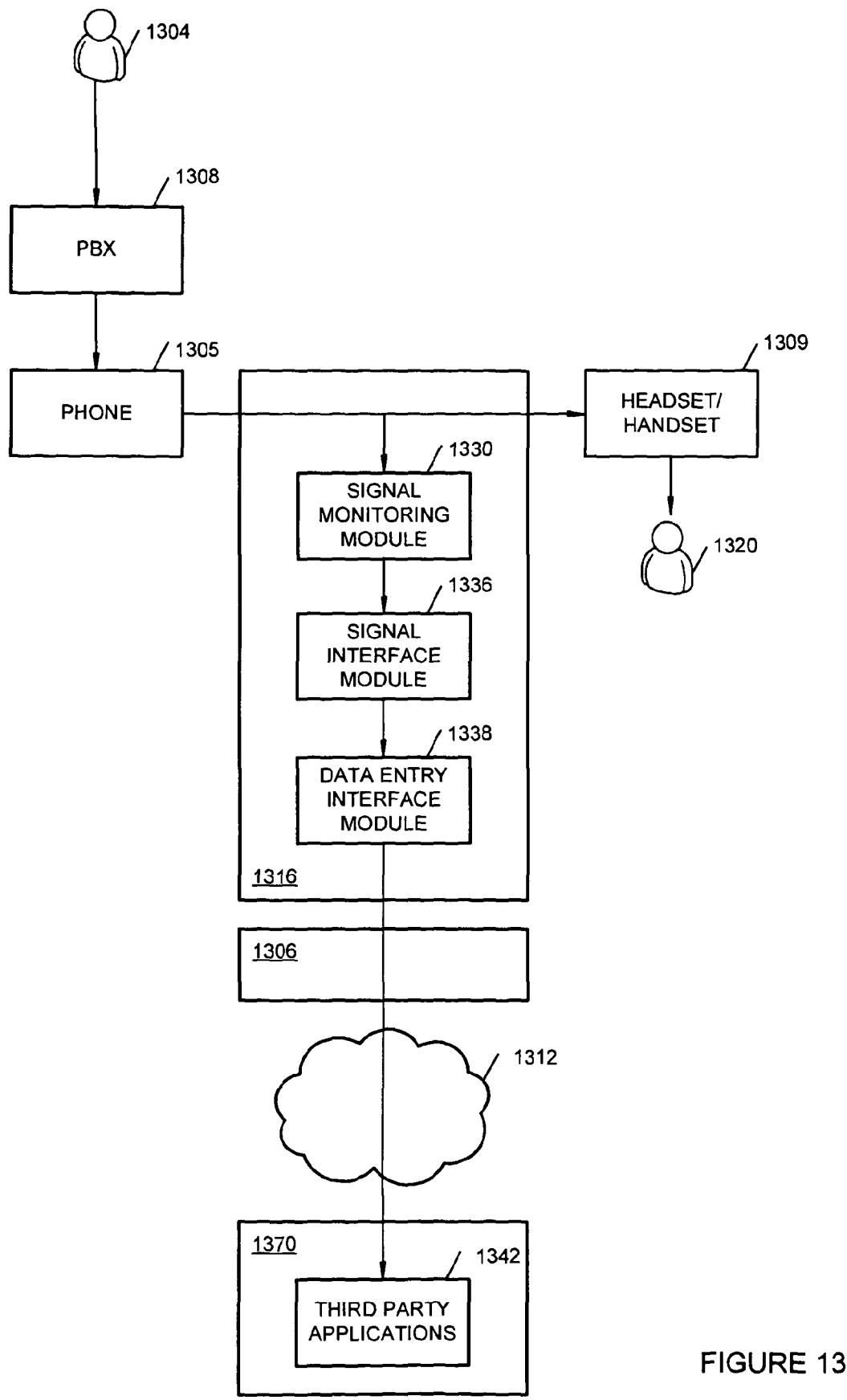

FIG. 13 schematically shows a call processor in accordance with an embodiment of the invention in which data extraction is implemented as hardware.

Figure 14:
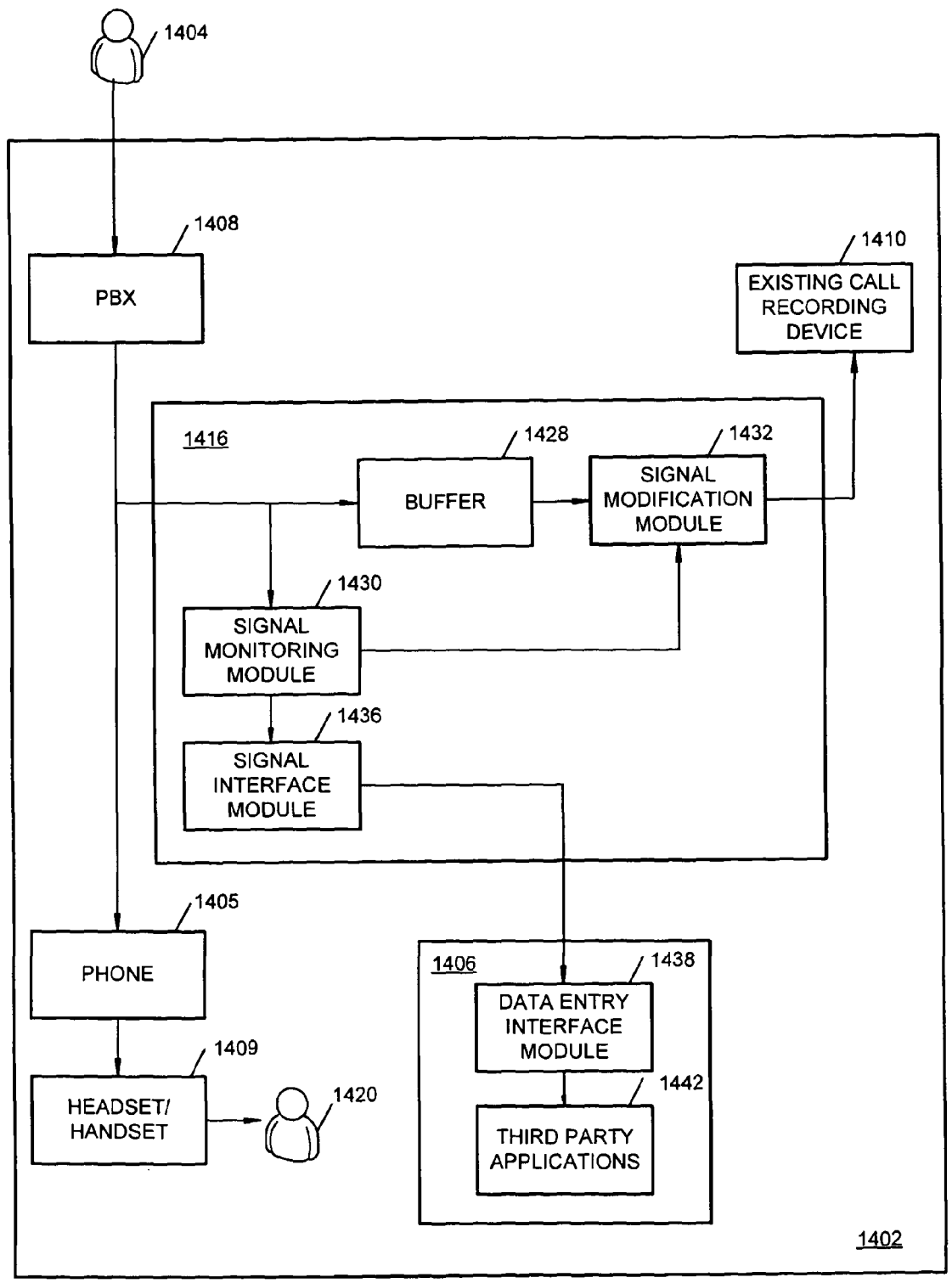

FIG. 14 schematically shows a call processor in accordance with an embodiment of the invention in which signal modification is performed at or near a call recording device, and in which data extraction is performed at the same location.

DETAILED DESCRIPTION OF THE EMBODIMENTS

FIG. 2 schematically shows an exemplary call centre operation 200 that implements methods and call processors in accordance with various embodiments of the invention.

An incoming call from customer 204 is routed over a network 212 to the call centre 202, where it is switched by private branch exchange (PBX) 208 or the like to a phone 205 of one of a number of agents 220 operating computer terminals 206. Each phone 205 is coupled to the corresponding computer terminal 206 by an adapter 207, which also connects to a handset or headset (not shown) of the agent 220.

In an embodiment, described below with reference to FIG. 3, signal modification, data extraction, and visual masking is performed locally at the computer terminals 206 by call processors 216a, implemented as software on the computer terminals 206. In such a case, call recording device 210 does not need to be used. Instead, calls can be recorded temporarily at the call processors 216a before being sent to call recording storage 211 via a local network 214 or external network, depending on the location of the storage device.

In other embodiments, described below with reference to FIG. 6, call processors 216a perform extraction of data and visual masking, but do not perform call recording. Call masking to the agent may or may not be implemented. In such cases, already existing call recording devices 210 can be retained (It will be appreciated that the call recording device can be 'branched off' before or after the PBX, for example from every single extension below the PBX. However, for purposes of clarity, only one implementation is shown). Where the existing call recording devices do not have call masking capabilities, call processor 216b or call processor 216c can be implemented to perform signal modification, for example either at the call centre or at its telecoms service provider. Call processors 216b, 216c can operate independently of call processors 216a, and are described below with reference to FIG. 12. In embodiments, the call processor can be implemented at other locations, as shown in, and described with reference to, FIGS. 6 to 14.

In embodiments, call processors 216b, 216c are standalone and function without the presence of call processor 216a. As such, call processors 216b and 216c can alternatively be introduced at call centres having existing data extraction methods (that is, without the need to implement call processors 216a). Although FIG. 2 shows call processors 216b, 216c as separate entities from the call recording devices 210, in some embodiments the call processors can be integrated into the call recording devices, for example as software modules.

FIG. 3 schematically shows an embodiment of a call processor 316 implemented as software on a computer terminal 306 of a call centre agent 320. Call processor 316 is configured to mask DTMF tones for the recorded data. The DTMF tones to the agent's 320 headset/handset 309 are not masked or recorded.

In more detail, an incoming call from a caller 304 is switched to the phone 305 of agent 320 by PBX 308. An adapter 307 outputs the data signals representing audio to the headset/handset 309 of the agent 320 as well as the audio conversion module 326 of the call processor 316. The data signals may comprise mono or stereo analogue audio signals, mono or stereo digital signals, mono or stereo Voice over Internet Protocol (VoIP) data signals, mono or stereo packetized audio data, and the like.

The audio conversion module 326 is configured to convert the various data signals into standard digital audio, for analysis. The methods used by the audio conversion module 326 to convert the data signals include those familiar to those skilled in the art of audio processing, for example decompressing of standard audio codecs (e.g. G.711μ-Law, G.711 a-Law, G.729 and GSM), removing header and other non-audio information from packetized data, and so on.

The digital audio is output to buffer 328 and signal monitoring module 330.

The signal monitoring module 330 is configured to detect characteristic information (predetermined patterns) in the digital audio, for example particular audio tones such as DTMF tones. The signal monitoring module 330 is also configured to determine information related to the characteristic information, such as a number or letter represented by a DTMF tone, a time at which the pattern is detected within the digital audio signal, the duration of the tone (pattern), the number of DTMF tones detected, and so on.

The methods by which the signal monitoring module 330 determines whether a predetermined pattern has been found in the digital audio include those familiar to those skilled in the art, such as Fast Fourier Transformations (FFT) and digital signal processing including Goertzel analysis. These processes are usually dependent on the nature of the predetermined pattern being searched for within the digital audio, and corresponding steps may need to be taken to ensure that the appropriate method is used for each type of predetermined pattern. Such aspects can be defined as configuration settings for the signal monitoring module 330.

Timing information established by the signal monitoring module 330 is output to a signal modification module 332. Thus information such as the detected pattern's position within the digital audio can be used by the signal modification module to determine how or when to modify the signals, for example by applying a mask. In particular, the timing control signal can indicate a start time and a finish time for each tone, or start and finish times for a set of tones. In this way, detected DTMF tone signals that would otherwise be recorded by recording module 334 are masked by signal modification module 332.

It will be appreciated that the detection of predetermined patterns will usually take a finite amount of time. For example, the recognition of DTMF tones in digital audio can take about 10-20 ms. The buffer 328 is configured to temporarily store the audio signals, in order to allow the signal modification module 332 to modify a portion of the signal that precedes the detected start time of each tone, for example by masking the digital audio. Signal modification module 332 may also modify a portion of the signal following the detected finish time for each tone.

With reference to FIG. 5, which schematically shows the detection and masking of two DTMF tones 515a, 515b, the signal monitoring module 330 detects at time $T_1$ that DTMF tone 515a has started, and detects at time $T_2$ that the tone has ended. As is evident a portion of the DTMF tone 515a exists before the detected start time $T_1$. The signal modification module 332 may therefore apply a mask 517a to include the portion of DTMF tone 515a that precedes the detected start time based on the time signal $T_1$ (i.e. from time $T_1-\delta t_1$). To ensure that the entire DTMF tone is masked, the signal modification module 332 may also apply the mask 517a to a period of time subsequent to the detected finish time $T_2$ of tone 515a (i.e. $T_2+\delta t_2$). DTMF tones 515a and 515b may be of different duration. Likewise, the values for $\delta t_1$ and $\delta t_2$ may also be of different duration. In an embodiment, signal modification (e.g. masking) is performed for the audio in its entirety, for example until all 16 digits of a credit card have been entered. Although in FIG. 5 two DTMF tones are shown, the general principle of signal modification such as masking characteristic information can be readily ascertained.

Thus the modification to the signal applied by the signal modification module renders the detected pattern unattainable from the recording. In an embodiment, the signal modification module 332 masks the digital audio signal by replacing it with an audible tone, e.g. at 1-2 kHz. In this way, according to one aspect of the invention, no part of the predetermined patterns detected by the signal monitoring module will appear in the masked digital audio sent for storage. This ensures that, for example, DTMF tones entered by a caller, or a security check process performed by the caller, are not passed to a recording module 334.

Referring again to FIG. 3, information established by the signal monitoring module 330 is also output to the signal interface module 336. The signal interface module 336 may determine an alphanumeric representation of the detected DTMF pattern. In this way, DTMF tones detected in the digital audio can be automatically communicated to a third-party application 342 and processed without the call centre staff member 320 needing to input any data into their computer terminal 306, thus removing the ability for the call centre staff member to note down the information for possible theft. Hence the secrecy of a caller's security details, credit card numbers, or other similar data, are preserved and not available for subsequent review in a recorded call made from the digital audio.

Furthermore, because the signal interface module 336 can be configured to determine and communicate the number of times a pattern or patterns have been detected, it is possible to confirm that, for example, all 16 digits of a credit card number have been received correctly as the customer types in his card details. If not all security information has been received, the third-party application 342 may prompt the call centre staff member to ask the caller to re-enter the security data. Thus, the signals communicated by the signal interface module 336 may provide confirmation that the security data has been correctly entered.

In this way, a customer's credit card transaction could be processed with minimal or no assistance from the call centre staff member and without the call centre staff member partaking in data entry.

The signals communicated by the signal interface module 336 to the third-party application 342 can be communicated via electronic communication, such as ActiveX communication, Internet Protocol communication, Application Programming Interface (API) communication, signals which mimic computer keystrokes, or any other electronic methods.

A data entry interface module 338 is configured to adapt the information, the method of its display within the third-party application 342 or the operation of the third-party application, such that the information is displayed within the third-party application in a suitable format, or that the third-party application operates in a desired manner. Where the third-party application is already configured to display the information in a suitable format, or operate in the desired manner, the data output by the data entry interface module 338 may be the same as the signals received from the signal interface module 336. In this way, the data entry processor need not change the signals or their method of display within the third-party application, or the operation of the third-party application, and can simply pass them directly to the third-party application 342.

In an embodiment, the data entry interface module 338 is configured to apply visual masking commands or methods. In this way, a customer's secure credit card information communicated through DTMF tones (for example), can not only be eliminated from digital audio and the alphanumeric representation of the DTMF tones passed to a third-party application, but the visual display of the third-party application can be controlled to make the alphanumeric representation of the DTMF information effectively obscured or invisible. In this way, not only does the customer's secure information become eliminated from the digital audio sent to storage, if any screen recording applications or processes are operational on the call centre staff member's computer, the screen recordings will not contain a recording of the customer's secure information either. In addition, the call centre staff member never sees the card details, and hence cannot steal them.

The management module 340 is configured to determine information about each call, such as the length of the call and the times at which signal modification was applied and for how long. It also allows this information to be associated with the customer and the third-party application.

In the embodiment shown in FIG. 3, call recording is performed locally at the computer terminal 306 of the agent 320 by call recording module 334. It is noted that there is no "overwriting" of recorded DTMF tones. Rather, DTMF tones are simply not recorded because of the buffering. The recordings can be passed to a server periodically or at the end of the call. Thus, calls can be constantly monitored and, where applicable, modified without the need to pause or switch between 'normal' and 'safe' modes.

FIG. 4 shows a flow diagram of the steps performed by the apparatus of FIG. 3, in relation to the recording of modified signals. At step S402 the signals are received. These may be converted to, for example, digital audio. At step S404 the signals are buffered and at step S406 the signals are monitored for predetermined characteristics. If they are detected (step S408, 'YES') then the signals are modified. Otherwise (step S408, 'NO') the method returns to step S406. At step S410 signal modification is applied to the buffered signals, before being recorded at step S412. At step S414, data is extracted.

It is to be understood that the specific order of steps in the methods disclosed are examples of exemplary approaches, and that steps may be rearranged or omitted. For example, some embodiments do not implement buffering (step S404) as shown in FIG. 4. Similarly, some embodiments do not perform recording (step S412) or data extraction (step S414). In other embodiments, the steps can be performed at different locations. For example, signal monitoring and modification can be performed at a first location, and signal monitoring and data extraction can be performed at a second location. Thus some or all of the steps shown in the flow diagram of FIG. 4 can be performed by the apparatus described below with reference to FIGS. 6 to 12.

FIG. 6 schematically shows a call processor 616 for extracting data from the DTMF tones in accordance with an embodiment. The call processor 616 is implemented as software on the computer terminal 606 of the agent 620 who is communicating with caller 604. In this particular embodiment, there is no masking of the DTMF tones. The components of the call processor 616, namely the audio conversion module 626, the signal monitoring module 630, the signal interface module 636, and the data entry interface module 638, are generally configured as the corresponding modules shown in, and described with reference to, FIG. 3. However, an alternative implementation, shown in FIG. 6, is an adapter 623 for converting proprietary digital audio format to audio. Further alternatives (which will be described below) may include (for VoIP) the use of a second LAN card in the computer terminal and a bridged LAN connection to the phone.

FIG. 7 schematically shows a call processor 716 for extracting data from the DTMF tones in accordance with an embodiment. The call processor comprises a signal monitoring module 730, a signal interface module 736 and a data entry interface module 738. In contrast to FIG. 6, the call processor 716 of FIG. 7 is implemented as hardware at the desktop of the agent 720, for example as an adapter between phone 705 and headset/handset 709. In this particular embodiment, signal modification to the agent 720 is not performed. In an embodiment, the data entry interface module 738 outputs signals to third party applications 742 resident on the agent's computer terminal 706 by means of a USB interface mimicking computer keystrokes, or other signalling.

FIG. 8 schematically shows a specific example of a hardware implementation of the call processor shown of FIG. 7. The call processor 816 comprises an audio interface 850 for receiving the data signals, a DTMF decoder 852 for recognizing the DTMF tones, and a microcontroller 854. The microcontroller 854 comprises a data processor 856 for processing the data signals and a USB keyboard emulator 858 that mimics the computer keystrokes. In this way, the DTMF tones can be directly 'inserted' into the third party applications resident on the agent's computer terminal 806 without input from the agent 820.

FIG. 9 schematically shows a call processor 916 for extracting data from the DTMF tones in accordance with an embodiment. The call processor 916 is implemented as hardware at the desktop of the agent 920. In this particular embodiment, signal modification to the agent 920 is also carried out by signal modification module 932. For example, the signal modification module can take the volume to zero, or apply a signal on top of existing signal. The use of a buffer (not shown) is optional as the likelihood of the agent recognising the initial portion of the DTMF tone prior to masking is minimal. This is because DTMF is very difficult for humans to interpret, and when combined with the very short duration of the DTMF tone heard by the agent prior to masking (around 10 ms), it becomes impossible. Signal monitoring is performed by signal monitoring module 930. In this embodiment, the data entry interface 938 outputs signals to third party applications 942 resident on the agent's computer terminal 906 by means of a USB interface mimicking computer keystrokes, or other signalling.

FIG. 10 schematically shows an embodiment of a call processor 1016 in which the audio signal is taken from the PBX 1008 side of the phone. The call processor 1016 now comprises a signal decoding module 1026 to translate from proprietary digital audio format to audio prior to performing signal monitoring at signal monitoring module 1030. As such, the signal decoding module 1026 can be considered comparable to an audio conversion module. There is also provided a signal interface 1036 and a data entry interface 1038, similar to those described previously.

FIG. 11 schematically shows an embodiment of a call processor 1116 representing the VoIP version of the above described call processors, operating in software at the agent desktop level. The signal monitoring module in this embodiment comprises a packet monitoring module 1130. Also provided are a signal interface 1136 and a data entry interface 1138. For implementing VoIP, the computer terminal 1106 includes two LAN cards 1160 connected by a bridge 1162, for outputting the packet stream to the VoIP phone 1122 of the agent 1120. The computer terminal also includes third party applications 1142.

FIG. 12 schematically shows an embodiment of a call processor 1216 configured to block DTMF tones for existing call recording devices. The call processor 1216 comprises a signal monitoring module 1230, a buffer 1228 and a signal modification module 1232. The call processor 1216 may be considered to be "always on" and autonomous, which is to say that it does not need to be switched between modes and can function independently. Here, call processor 1216 is shown as a separate unit to call recording device 1210, though it will be appreciated that the call processor 1216 can be integral to the call recording device 1210, either as hardware or software.

FIG. 13 schematically shows an embodiment of a call processor 1316 for extracting data from the DTMF tones. The call processor comprises a signal monitoring module 1330, a signal interface module 1336 and a data entry interface 1338.

In contrast to the call processor embodiment shown in FIG. 7, the call processor of FIG. 13 outputs signals to one or more third party applications 1342 resident not on the agent's computer terminal 1306 but instead on a remotely located computer 1370, such as a server or workstation. In an embodiment, the signal interface module 1336 encrypts the data extracted from the DTMF tones (or other predetermined characteristics) with a known secure encryption algorithm, and the data entry interface module 1338 transmits the encrypted data over network 1312 (e.g. a wide area network, such as the Internet) to computer 1370 directly (that is, bypassing the agent's computer terminal 1306). The third party applications 1342 then decrypt the data. In another embodiment, the agent's computer terminal 1306 is used as a gateway for the communication between the data entry interface and computer 1370. However, no sensitive data in plain text form need ever be exposed to the agent's computer terminal 1306, even temporarily. In this way, even if a malicious person or application gains full control of the agent's computer terminal 1306, a customer's sensitive data could not be determined. Third party applications 1342 at remotely located computer 1370 can then decrypt and process the customer's sensitive information, returning an authorisation code, transaction number, or similar to the call processor 1316 or agent's computer terminal 1306. The customer's sensitive information cannot be determined based on the authorisation code or other information that is returned. In this way, a call centre can effectively outsource processing of customers' sensitive data, and remove some or all of the processes required to monitor agent computer terminals 1306 to detect intrusion or other malicious activity.

FIG. 14 schematically shows an embodiment of a call processor 1416 configured to block DTMF tones to an existing call recording device 1410, and also to extract data from the DTMF tones. It will be appreciated that this embodiment is applicable to other types of predetermined characteristics. In contrast to the call processor of FIG. 12, the call processor of FIG. 14 also includes a signal interface module 1436. The signal interface module 1436 may include components of the call processor described with reference to FIGS. 7 and 8. In an embodiment, when the signal monitoring module 1430 detects DTMF tones in the audio signal, the signal interface module 1436 passes signals representing the DTMF tones to one or more respective agent computer terminals 1406 (only one agent computer terminal is shown for clarity). In an embodiment, the signals representing DTMF tones are received at agent computer terminals by a data entry interface 1438 operating in software. In this way, the signals representing DTMF signals can be directly 'inserted' into the third party applications 1442 resident on the agent's computer terminal 1406 without input from the agent 1420, and without any connection between the agent's computer terminal 1406 and the PBX 1408, phone 1405, or headset/handset 1409. In another embodiment, the data entry interface 1438 operating in software at the agent computer terminal 1406 may not be required, for example if the third party applications 1442 are capable of receiving and processing the signals representing DTMF tones directly. In an embodiment, the signals between the signal interface module 1436 and agent computer terminal 1406 are sent over the call centre's data network (e.g. local area network).

The means for identifying the appropriate agent computer terminal to which the signals should be sent may vary based on the type of telephone system installed at the call centre, and on where the existing recording device 1410 is located. Such means will be evident to a person skilled in the art. For example, incoming calls may be mapped to an agent's computer terminal by means of line identification. As another example, for a company with a VoIP compatible PBX and VoIP compatible call recording device, the packet headers of the VoIP packets containing audio information which is to be recorded may also include the IP address of the agent computer terminal 1406 or phone 1405 where the call is received by an agent. Thus, when the signal monitoring module 1430 detects DTMF tones within the audio stream, the signal interface module 1436 can additionally identify the relevant computer terminal's IP address, and this can then be used when routing signals representing DTMF tones.

It will be understood that references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Similarly, when a particular feature, structure, or characteristic is described in connection with one embodiment, it will be within the knowledge of one skilled in the art to effect such feature, structure, or characteristic in connection with other embodiments whether or not explicitly described. For example, it is possible to combine a first call processor for extracting data from DTMF tones, in accordance with the call processor shown in FIG. 7, with a second call processor configured to block DTMF tones for existing call recording devices, in accordance with the call processor shown in FIG. 12. The two call processors may operate in the same environment such as a call centre. Indeed, there may be more than one call processor of each "type", i.e. more than one call processor for extracting the DTMF tones and more than one call processor for blocking the DTMF tones. For convenience, these two types of call processor can be referred to as "decoder" and "filter" call processors. Although there is no communication between the decoder and filter call processors, they act jointly to block DTMF tones to an existing call recording device, and also extract data from the DTMF tones and send the extracted data directly to the agent's computer terminal, with the extracted data possibly prevented from being displayed to the agent. This enables a call centre to isolate its existing call recording system, existing screen recording system and also its agents from a customer's sensitive data, without having to make any changes to its existing computer systems in use at the agent's computer terminal, or its call or screen recording systems. As another example, the call processor 1316 shown in FIG. 13 may include a signal modification module 932 as shown in FIG. 9.

Although in foregoing embodiments DTMF tones in digital audio signals are detected and masked, the signal data may comprise VoIP data packets. In the case of VoIP, DTMF "tones" are transmitted in specific packets (RFC 2833 RTP Event packets). In that case, the data corresponding to the voice packets can be recorded while the DTMF packets are discarded, i.e. packet filtering can be applied. However, at the transmitter there is a small delay for the DTMF tone to be recognised, prior to the transmitter sending an RFC 2833 RTP Event packet. Hence, in this case, buffering can be used to mask all DTMF information preceding the receipt of the RFC 2833 RTP Event packet.

Although in foregoing embodiments the predetermined patterns are described as comprising audio tones such as DTMF tones, other kinds of predetermined patterns can also be detected, for example voice signals that contain voice biometric information, information representing a spoken word or phrase, or spoken security information (such as a password, pass phrase, or other security information). Thus any of the aforementioned signal monitoring modules can be configured to establish the information with reference to external sources, e.g. a database of customer passwords, and using digital signal processing techniques such as speech recognition techniques. For voice recognition where only part of the password is to be provided by the caller (e.g. two random letters of a ten letter word), the detected voice patterns corresponding to the letters need only be masked for the recording module as the agent cannot construct the full password. Of course, for voice recognition where a full password is required, the output to the agent can be masked. Further still, at the point at which the password is to be spoken, the audio to the agent can be switched off.

As such, the signal monitoring module may make reference to an additional source in order to determine the nature of the signals communicated to an external source. In this manner, other functionality is possible (for example referring to a database containing customer passwords to ascertain whether a customer has passed a security check, or communicating with a credit card payment system to authorise a customer transaction).

Although the foregoing embodiments indicate that the signal interface module is configured to determine and communicate the number of times patterns have been detected, other variations are envisaged. For example, the signals communicated by the signal interface module can be configured to indicate the duration of the detected pattern and the proportion or length of the detected pattern which has been detected within a defined timeframe. In this way, it is possible for the third-party application to determine how much of the customer's security information has been received.

In an embodiment, the signal interface module provides confirmation that a security check has been passed. In this way, it is possible to confirm, via the third-party application, to the call centre staff member, that the caller has passed a security check, without the call centre staff member having to perform or assist the security check operation.

In foregoing embodiments the signal interface module is described as communicating signals representing one or more of an alphanumeric representation of the detected pattern, the number of times a pattern or patterns have been detected, the duration of the detected pattern, the proportion or length of the detected pattern which has been detected within a defined timeframe, confirmation that a security check has been passed, and confirmation that a transaction has been authorised. Alternatively, or in addition, other types of signals can also be communicated. These include signals representing the type of pattern which has been detected, meta-data relating to the detected pattern and the digital audio, the value of a hash function operating on the detected pattern, a uniquely-generated identifier representing the detected data, a true/false value based on whether or not a predetermined pattern has been detected, a statistical probability that the predetermined pattern has been detected, a reference to a record within a database which is matched or probably matched by the detected or probably detected pattern, 'begin data' or 'end data' signals based on the detected pattern, a value or sequence of separate values based on the detected pattern, and no signal being communicated.

For example, based on the type of pattern which has been detected, it is possible for the third-party application to be made aware of whether (for example) the customer has generated a DTMF tone using his telephone keypad.

Meta-data relating to the detected pattern and the digital audio enables the third-party application to be made aware of (for example) the time the pattern was detected, the number of occurrences within the digital audio, and the duration of the pattern. This use also allows such data to be stored with or alongside the masked digital audio, for later searching or reporting. In this way, it is possible to easily find all recorded calls where DTMF tones have been masked, simply by searching through the associated meta-data for these calls.

The value of a hash function operating on the detected pattern, and the uniquely-generated identifier representing the detected data, enable the third-party applications to store representations of credit card numbers, without storing the actual credit card numbers themselves, and without the credit card number being stored in the call recording. This 'tokenisation' or 'hashing' is familiar to those skilled in the area of credit card security or cryptography, and acts to improve security. The 'token' or 'hash' values are unable to be used to make credit card transactions, but they are useful for reporting on customer data, determining where the same credit card has been used to make purchases at another time, and for other marketing or statistical analysis.

True/false values based on whether or not a predetermined pattern has been detected, as well as signals representing a statistical probability that the predetermined pattern has been detected, allow third-party applications to determine the statistical 'confidence' that a customer has (for example) passed a security check.

Signals representing a reference to a record within a database which is matched or probably matched by the detected or probably detected pattern, allows a third-party application to be provided with (for example) the name of the customer who matches, or most likely matches, a security check just undertaken by a caller, but without the actual security information (such as a password) appearing in the associated call recording.

Signals representing 'begin data' or 'end data' based on the detected pattern allow a third-party application to (for example) be prepared to receive incoming card data, and to then stop receipt of data, based on the detection of particular DTMF alphanumeric characters. For example, if a customer entered his card details prefixed with a hash '#' tone, the signal interface module would effectively alert the third-party application that card details were following. A star '*' tone, for example, would end the receipt of card details by the third party application. Also in this manner, customers who make a mistake entering their card details can press hash '#' to start again.

A value or sequence of separate values based on the detected pattern allows a third-party application to determine that it is receiving a signal from the call processor and not from another source. For example, in one embodiment, the call processor outputs signals to a computer terminal by means of a USB interface mimicking computer keystrokes. By communicating a sequence of separate values (for example a predetermined semi-random string which has a very low probability of ever being typed by a human), the third party application can determine accurately that it is receiving a signal directly from the call processor and not from a human typing into a keyboard.

Communicating no signal based on the detected pattern allows the call processor to (for example) automatically correct some errors which may be introduced by a customer typing in card details. For example, card details do not contain the hash '#' character, so by not transmitting any signal when a customer types hash '#' the third-party application is isolated from the error. This same process is useful in eliminating the transmission of special 'control' tone sequences (such as 'begin data' and 'end data' described above), which may be used primarily to communicate with the call processor but which are not intended for onward communication to a third-party application.

Furthermore, signals communicated by the signal interface module may be communicated as the pattern is detected. Thus as DTMF tones are detected, the alphanumeric representations of them can be passed directly to the third-party application with no delay. Further still, the signals communicated by the signal interface module may be buffered and then communicated at a later time. As such, the entire DTMF sequence can be detected, and then their alphanumeric representations communicated in one go to the third-party application. Yet further, the signals communicated by the signal interface module may be communicated on demand from another appropriately-authorised source. In this way, an appropriately-authorised third-party application could request from the signal interface module the number of DTMF tones which have been detected during the current call.

During communication with a third-party application, it is advantageous if the identity of the third-party application is established as being appropriately authorised to receive such communications. The authorisation credentials can be in the form of a security certificate or other similar certification device familiar to those skilled in the art of communications security.

The signals communicated by the signal interface module may be with the operating system of a data processing apparatus (a computer). The signals communicated by the signal interface may be with the operating system of a telephone or other portable communication device. The signals communicated by the signal interface may be communicated via an intermediate method (such as via text files, XML files, or Really Simple Syndication (RSS)). In these ways, many different third-party applications can be communicated with via the signal interface, according to communications format standards familiar to those skilled in the art.

The signals communicated by the signal interface may represent "plain text" unencrypted communications. They may also represent encrypted communications, using data encryption techniques familiar to those skilled in the art. In these ways, both 'open' and 'closed' (or secure) communications are possible with third-party applications.

Although in foregoing embodiments a mask applied by the signal modification module replaces the detected pattern with an audio tone of a single pitch, the modification could alternatively comprise random audio tones, or a white noise signal. Additionally, the modification applied by the signal modification module may act to remove or obscure part of the detected pattern, whereby the initial data signals which represent audio are unable to be determined in their entirety from the masked digital audio. In these ways, the detected signal is variously obscured in the digital audio, but the digital audio will still contain audible 'placeholders' to signify that a pattern was detected.

The modification applied by the signal modification module may act to encrypt the detected pattern. In this way, according to one aspect of the invention, a customer's personal security data can be encrypted (preferably with an encryption algorithm familiar to those skilled in the art) for later decryption by an appropriately-authorised application or person. In this manner, people or applications without the appropriate authorisation to decrypt the pattern will be unable to determine its nature.

The modification applied by the signal modification module may act on one of the stereo channels of the digital audio signals, if the digital audio signals are in stereo. In this way, according to one aspect of the invention, a customer's credit card details sent through DTMF can be eliminated from the digital audio, but any conversation or other audio signals in the digital audio being spoken by, for example, a call centre staff member, are unaffected. Additionally, the modification applied by the signal modification module may act on both of the stereo channels of the digital audio signals, if the digital audio signals are in stereo.

The signal-related data output by the data entry processor may represent a placeholder (such as the alphanumeric character '*'). In this way, a customer's data may be represented on the call centre staff member's computer as a series of asterisks, 'X' marks, or similar, to obscure the sensitive information, while still fulfilling the requirement of the call centre staff member's computer applications that relevant data should be entered into the application.

Further, the placeholder may be a random alphanumeric character. It may further be in the same format of information expected to be received by the third-party application. In this way, the call centre staff member's computer application may be satisfied as to the format, composition, length or other attributes of any data entry requirements.

Additionally, the placeholder may be deliberately not in the same format of information expected to be received by the third-party application. In this way, a third-party application may be provided with information which it interprets as deliberately wrong, in order to trigger a subsequent request of further data.

The signals received from the signal interface may be modified to conform to the format expected to be received by the third-party application, prior to the output of signal-related data to the third-party application. In this way, for example, card details may be encrypted to ensure further security.

Although in foregoing embodiments the call processor is configured to prevent the alphanumeric representations from being displayed by the software application and/or entered by the emulated input device signal as data into a data entry field, other interactions or commands are also contemplated.

The interactions or commands may act to determine that signals about to be communicated with a third-party application are to be displayed in the expected data entry location of the expected third-party application. For example, the command or method may be configured to determine the current 'window title' and the current data entry field title of a third-party application, and deny signal communication to unexpected locations. In this way, agents can be prevented, for example, from seeing sensitive card details in a separate location from where they can be stolen.

The interactions or commands may act so that the display of alphanumeric representation within the third-party application is made automatically to only an expected data entry location. For example, the command or method can include locating a data entry field with a particular property or characteristic (for example one which has a text label 'CV2' on its left) and then passing the CV2 element of the card data only to this field. In this way, card data is forced into its intended location, and cannot therefore be stolen by agents from other locations.

The interactions with the third-party application or commands output to the third-party application may act to restrict, inhibit or deny manual data entry in the third-party application. For example, the call centre staff member would be denied the ability to enter, correct, overwrite or (critically) copy the customer's sensitive data from their computer screen.

The interactions with the third-party application or commands output to the third-party application may act to alter the visual display of the third-party application. They may also act to change the third-party application's display to show placeholder information (such as the alphanumeric character "*"). In this way, even though a call centre staff member's computer application may be preconfigured to display sensitive information on the computer screen, the display can be altered through the use of visual masking commands or methods to obscure the data with asterisks, or 'X' marks or similar.

The interactions with the third-party application or commands output to the third-party application may act to remove existing restrictions on the format of manual data entry within the third-party application. Thus data passed directly to the third-party application may be of a different format than that allowed for by manual data entry.

The interactions with the third-party application or commands output to the third-party application may act to hide or otherwise obscure portions of the third-party application. Accordingly, the customer's secure data can be hidden from the call centre staff member's computer screen, to eliminate the ability of the staff member to note the information.

The interactions with the third-party application or commands output to the third-party application may act to modify the operation of the third-party application. It may further act to insert a 'callback' process (which acts to allow the third-party application to provide signals back to the data entry processor, or to request transmission of signal-related data from the data entry processor). For example, a third-party application can request the customer's sensitive credit card data to be communicated at the point the call centre staff member attempts to authorise the credit card data, thus avoiding display or communication of the credit card information to the call centre staff member's computer screen in advance.

The interactions with the third-party application or commands output to the third-party application may act to modify the document object model of a web page displayed in a web browser. For example, a web page can be altered to change a specified credit card entry field into a 'display as asterisks' field, thus obscuring the card details with asterisk '*' characters or similar, and further restricting the agent's ability to copy card data from that field.

The interactions with the third-party application or commands output to the third-party application may act to detect changes in third-party applications, prior to communicating signals to the third-party application. For example, a command or method may be configured to detect the activation of a 'submit' function on the call centre staff member's computer screen, and communicate the card details at the point the submit function is activated. In this way, for example, an agent never sees card data on screen.

The interactions with the third-party application or commands output to the third-party application may act to decrypt information already encrypted elsewhere. In this way, for example, data can be placed in plain sight but in an encrypted form on a call centre agent's computer screen, and then be decrypted immediately prior to processing.

The interactions with the third-party application or commands output to the third-party application may act to issue commands recognised by the third-party application. Further, these commands or methods may mimic manual commands which may be performed by an operator of the third-party application. If, for example, a customer is confirming credit card details for a transaction using DTMF tones, the third-party application may be commanded to process the transaction (for example by mimicking the activation of a 'submit' function on the call centre staff member's computer screen) once the correct number of credit card digits has been received.

The interactions with the third-party application or commands may further act to gather information from a third-party application and combine it with data from the signal interface module prior to issuing commands recognised by the third-party application. For example, if a call centre agent is taking transaction details from a customer and entering them into a payments website, the customer's name, address and transaction price details can be gathered from where they have already been entered into the website by the call centre agent, combined with the customer's card details transmitted through DTMF tones, and then an HTTP 'post' command executed using visual masking commands or methods, to transmit all details for payment authorisation. In this way, the call centre agent never sees the card details on screen.

The interactions with the third-party application or commands output to the third-party application may act to reverse or undo the effect of any interactions with the third-party application or commands previously issued to the third-party application. Accordingly any changes which have been made to the third-party application's performance or appearance can be reversed, after (for example) a transaction has been processed.

The interactions or commands may include Application Programming Interface (API) communication with a third-party application, altering a web page's HTML content or document object model, macros or scripts, or any similar or related communication required to interact with the third-party application.

The signal-related data may be sent to the third-party application alphanumeric character-by-character, as the pattern is detected by the audio processor. In this way a customer's credit card details represented in DTMF tones may be sent one character at a time to the third-party application. Alternatively, the signal-related data may be sent to the third-party application in one or more blocks. For example, a customer's credit card details may be accumulated as they are received, and then communicated in one block to the third-party application.

The signal-related data may be sent to the third-party application at different times based on the mode or status of the third-party application. Thus placeholder characters may be communicated to the third-party application until a point later in the transaction, when the real customer sensitive data is communicated. This would ensure that customer sensitive data did not appear on a call centre staff member's computer screen until the moment at which a transaction was to be authorised, for example.

The signal-related data may be sent to the third-party application on receipt of an appropriate request by the third-party application. In this way an appropriately-authorised third-party application could request from the data entry processor (for example), that the customer's credit card details be communicated at the point the credit card was to be authorised, thus ensuring that the customer's credit card details did not appear on the call centre staff member's computer screen at all prior to that event.

The interactions with the third-party application or commands output to the third-party application may be sent to the third-party application at the same time as the signal-related data. They may also be sent to the third-party application at any time before the signal-related data. They may also be sent to the third-party application at any time after the signal-related data.

The third-party application may comprise a computer operating system. It may also comprise a telecommunications device. Further the telecommunications device may be a mobile phone. Thus common telecommunications devices and computers used in a call centre environment or in an environment where transactions are performed with customer sensitive data, can have customer sensitive data eliminated from their visual displays.

The third-party application may be a web page being displayed within a computer operating system. It may also be an application running within a computer operating system. The third-party application may be a web page being displayed on a telecommunications device, including a mobile phone. It may also be an application running within a telecommunications device, including a mobile phone. It may also be a database or other data storage medium. Thus commonly-used data entry interfaces (such as computer applications or websites) can have customer sensitive data eliminated from their visual displays, and customer-sensitive data can also be communicated directly into a database, without appearing on a call centre staff member's computer screen.

While the described methods and apparatus can provide particular advantages to call centre operations, they are also applicable to other communication technologies that implement call recording of one form or another. In this regard, although in foregoing embodiments the processing of signals is described as being performed for 'incoming' signals, the processing of signals can also be performed for 'outgoing' signals, e.g. at the call originator side.

Although the present invention has been described hereinabove with reference to specific embodiments, it will be apparent to a skilled person in the art that modifications lie within the spirit and scope of the appended claims.

The invention claimed is:

1. A method of processing signals of a telephonic communication, the signals conveying sensitive and non-sensitive information, the method comprising:
   receiving signals at a call processor from a caller device;
   processing the signals at the call processor to provide a first version of the signals that is to be recorded and a second version of the signals that is to be output as audio to an agent device, both versions conveying the same information;
   monitoring at the call processor the first version of the signals to detect one or more instances of one or more predetermined characteristics comprising the sensitive information conveyed by the signals; modifying the first version of the signals by removing the identified predetermined characteristics from the first version of the signals; and
   outputting the modified first version of the signals for recording on a call recording device.

2. A method according to claim 1, further comprising recording the first version of the signals at the call processor.

3. A method according to claim 1, further comprising buffering the first version of the signals, and wherein modifying the first version of the signals comprises removing at least a portion of the buffered first version of the signals preceding a point of detection for each identified instance of the predetermined characteristics.

4. A method according to claim 1 further comprising determining a respective alphanumeric representation corresponding to each identified instance of the predetermined characteristics, and outputting data indicative of the respective alphanumeric representation for use by a software application.

5. A method according to claim 4, further comprising generating a respective emulated input device signal for each of the alphanumeric representations, and wherein the outputting of data comprises outputting the emulated input device signals.

6. A method according to claim 4, further comprising preventing a display of the alphanumeric representations by the software application.

7. A method according to claim 4, further comprising determining a target computer device from among a plurality of computer devices, the outputting comprising transmitting the data to the target computer device.

8. A method according to claim 7, wherein the target computer device is determined based on an IP address contained in the signals.

9. A method according to claim 4, wherein the software application resides on a computer device at a location remote from the call processor, the method further comprising encrypting the data.

10. A method according to claim 4, wherein the data indicative of the alphanumeric representations output by the call processor is entered into a validated data entry field of the software application.

11. A method according to claim 1, further comprising:
    monitoring at the call processor the second version of the signals to detect one or more instances of one or more predetermined characteristics comprising the sensitive information conveyed by the signals;
    modifying the second version of the signals by removing the identified predetermined characteristics from the second version of the signals; and
    outputting the modified second version of the signals.

12. A call processor for processing signals of a telephonic communication, the signals conveying sensitive and non-sensitive information, the call processor comprising:
    means configured to receive first and second versions of the signals received from a calling device, the first and second versions conveying the same information, the first version for being recorded, the second version for being output as audio to an agent device;
    means configured to monitor the first version of the signals to detect one or more instances of one or more predetermined characteristics comprising the sensitive information conveyed by the signals;
    means configured to modify the first version of the signals by removing the identified predetermined characteristics from the first version of the signals; and
    means configured to output the modified first version of the signals for recording on a call recording device.

13. A call processor according to claim 12, further comprising means configured to record the first version of the signals.

14. A call processor according to claim 12, further comprising means configured to buffer the first version of the signals, and wherein the means configured to modify the first version of the signals is configured to remove at least a portion of the buffered first version of the signals preceding a point of detection for each identified instance of the predetermined characteristics.

15. A call processor according to claim 12, further comprising:
    means configured to determine a respective alphanumeric representation corresponding to each identified instance of the predetermined characteristics, and
    means configured to output data indicative of the alphanumeric representations for use by a software application.

16. A call processor according to claim 15, further comprising means configured to generate a respective emulated input device signal for each of the alphanumeric representations, and wherein the means configured to output data is configured to output the emulated input device signals.

17. A call processor according to claim 15, further comprising means configured to prevent a display of the alphanumeric representations by the software application.

18. A call processor according to claim 15, further comprising means configured to determine a target computer device from among a plurality of computer devices, wherein the means configured to output data transmits the data to the target computer device.

19. A call processor according to claim 18, wherein the target computer device is determined based on an IP address contained in the signals.

20. A call processor according to claim 15, wherein the software application resides on a computer device at a location remote from the call processor, the call processor further comprising means configured to encrypt the data.

21. A call processor according to claim 15, wherein the means configured to output the data is further configured to enter the data into a validated entry field of the software application.

22. A call processor according to claim 12, further comprising means configured to output a modified second version of the signals.

23. A method of processing signals of a telephonic communication, the signals conveying sensitive and non-sensitive information, the method comprising:
   receiving signals at a call processor from a caller device, the signals including a first version of the signals to be recorded;
   buffering the first version of the signals;
   monitoring the signals to detect, in the buffered signals, one or more instances of one or more predetermined characteristics comprising the sensitive information conveyed by the signals;
   modifying the buffered signals by removing the identified predetermined characteristics; and
   outputting the modified buffered signals for recording on a call recording device.

24. A method according to claim 23, wherein modifying the buffered signals comprises removing at least a portion of the buffered signals preceding a point of detection for each identified instance of the predetermined characteristics.

25. A method according to claim 23, further comprising recording the modified signals.

26. A call processor for processing signals of a telephonic communication, the signals conveying sensitive and non-sensitive information, the signals being received from a caller device and including a first version of the signals to be recorded, the call processor comprising:
   means configured to buffer the first version of the signals;
   means configured to monitor the signals to detect, in the buffered signals, one or more instances of one or more predetermined characteristics comprising the sensitive information conveyed by the signals;
   means configured to modify the buffered signals by removing the identified predetermined characteristics, and
   means for outputting the modified buffered signals for recording on a call recording device.

27. A call processor according to claim 26, wherein the means configured to modify the buffered signals is configured to modify the buffered signals by removing at least a portion of the buffered signals preceding a point of detection for each identified instance of the predetermined characteristics.

28. A call processor according to claim 26, further comprising means configured to record the modified signals.

29. A method of processing signals of a telephonic communication, the signals conveying sensitive and non-sensitive information, the method comprising:
   receiving signals at a call processor from a caller device;
   processing the signals at the call processor to provide a first version of the signals that is to be recorded and a second version of the signals from which information is to be extracted, the first and second versions conveying the same information;
   at a first location:
      monitoring the first version of the signals to detect one or more instances of one or more predetermined characteristics comprising the sensitive information conveyed by the signals;
      modifying the first version of the signals by removing the identified predetermined characteristics from the first version of the signals; and
      outputting the modified first version of the signals for recording; and
   at one or more second locations:
      monitoring the second version of the signals to detect one or more instances of one or more predetermined characteristics comprising the sensitive information conveyed by the signals;
      determining a respective alphanumeric representation corresponding to each identified instance of the predetermined characteristics; and
      outputting data indicative of the alphanumeric representations for use by a software application.

30. A method according to claim 29, further comprising, at the first location, buffering the first version of the signals, and wherein modifying the first version of the signals comprises removing at least a portion of the buffered first version of the signals preceding a point of detection for each identified instance of the predetermined characteristics.

31. A method according to claim 29, further comprising recording the first version of the signals at the first location.

32. A method according to claim 29, further comprising, at the one or more second locations, preventing a display of the alphanumeric representations by the software application.

33. A method according to claim 29, further comprising, at the one or more second locations, modifying the second version of the signals by removing the identified predetermined characteristics from the second version of the signals, and outputting the second version of the signals for hearing.

34. A method according claim 29, further comprising, at the one or more second locations, generating a respective emulated input device signal for each of the alphanumeric representations, and wherein the outputting of data comprises outputting the emulated input device signals.

35. A method according to claim 29, further comprising entering the data into a validated data entry field of the software application.

36. A call processor for processing signals of a telephonic communication, the signals conveying sensitive and non-sensitive information, the call processor comprising:
   means for receiving signals from a caller device;
   means for processing the received signals to provide a first version of the signals that is to be recorded and a second version of the signals from which information is to be extracted, the first and second versions containing the same information;
   a first means at a first location, comprising:
      receiving means configured to receive a first version of the signals;

monitoring means configured to monitor the first version of the signals to detect one or more instances of one or more predetermined characteristics comprising the sensitive information conveyed by the signals;

modifying means for modifying the first version of the signals by removing the identified predetermined characteristics from the first version of the signals; and outputting means for outputting the modified first version of the signals for recording; and a second means at one or more second locations, comprising:

receiving means configured to receive the second version of the signals;

monitoring means configured to monitor the second version of the signals to detect one or more instances of one or more predetermined characteristics comprising the sensitive information conveyed by the signals;

determining means configured to determine a respective alphanumeric representation corresponding to each identified instance of the predetermined characteristics; and outputting means configured to output data indicative of the alphanumeric representations for use by a software application.

37. A call processor according to claim 36, wherein the first means further comprises buffering means configured to buffer the first version of the signals, and wherein the modifying means is configured to remove at least a portion of the buffered first version of the signals preceding a point of detection for each identified instance of the predetermined characteristics.

38. A call processor according to claim 36, wherein the first means further comprises means configured to record the first version of the signals.

39. A call processor according to claim 36, wherein the second means further comprises preventing means configured to prevent a display of the alphanumeric representations by the software application.

40. A call processor according to claim 36, wherein the second means further comprises:

modifying means configured to modify the second version of the signals by removing the identified predetermined characteristics from the second version of the signals, and outputting means configured to output the second version of the signals for hearing.

41. A call processor according to claim 36, wherein the second means further comprises generating means configured to generate a respective emulated input device signal for each of the alphanumeric representations, and wherein the outputting means configured to output data is configured to output the emulated input device signals.

42. A call processor according to claim 36, wherein the outputting means configured to output the data in the second means is further configured to enter the data into a validated data entry field of the software application.

43. A method of processing signals of a telephonic communication by a call processor, the signals conveying sensitive and non-sensitive information, the method comprising:

receiving the signals at a call processor from a caller device;

monitoring the received signals, at the call processor, to detect one or more instances of one or more predetermined characteristics comprising the sensitive information conveyed by the signals;

determining, at the call processor, a respective alphanumeric representation corresponding to each identified instance of the predetermined characteristics;

generating data indicative of the said alphanumeric representations;

determining a target computer device from among a plurality of computer devices; and outputting the data for use by a software application executable on the target computer device.

44. A method according to claim 43, further comprising modifying the received signals by removing the identified predetermined characteristics from the received signals, and outputting the modified signals for recording.

45. A method according to claim 43, wherein the data comprises a respective emulated input device signal generated for each alphanumeric representation.

46. A method according to claim 45, further comprising entering the emulated input device signal as data into a validated data entry field of the software application.

47. A method according to claim 43, further comprising preventing a display of the said alphanumeric representation by the software application.

48. A method according to claim 43, wherein the target computer device is determined based on an IP address contained in the signals.

49. A call processor for processing signals of a telephonic communication, the signals conveying sensitive and non-sensitive information, the call processor comprising:

means configured to receive the signals from a caller device;

means configured to monitor the signals to detect one or more instances of one or more predetermined characteristics comprising the sensitive information;

means configured to determine a respective alphanumeric representation corresponding to each identified instance of the predetermined characteristics;

means configured to generate data indicative of the alphanumeric representations;

means configured to determine a target computer device from among a plurality of computer devices; and means configured to output the data for use by a software application executable on the target computer device.

50. A call processor according to claim 49, further comprising:

means configured to modify the received signals by removing the identified predetermined characteristics from the received signals, and means configured to output the modified signals for recording.

51. A call processor according to claim 49, wherein the data comprises a respective emulated input device signal generated for each alphanumeric representation.

52. A call processor according to claim 51, further comprising means configured to enter the emulated input device signals as data into a validated data entry field of the software application.

53. A call processor according to claim 49, further comprising means configured to prevent a display of the alphanumeric representations by the software application.

54. A call processor according to claim 49, wherein the means configured to determine a target computer device is configured to determine the target computer device based on an IP address contained in the signals.

55. A method of conducting a transaction, the method comprising:
- establishing a telephonic communication between a customer and a call centre agent, the telephonic communication comprising signals conveying sensitive and non-sensitive information of the customer;
- processing the signals at a call processor to provide a first version of the signals that is to be recorded and a second version of the signals that is to be output as audio to the call centre agent, the first and second versions conveying the same information;
- monitoring, by the call processor, the first version of the signals to detect one or more instances of one or more predetermined characteristics comprising the sensitive customer information conveyed by the first version signals;
- modifying, by the call processor, the first version of the signals by removing the identified predetermined characteristics from the first version of the signals; and
- processing the transaction by a software application executing on a computing device, using the sensitive information conveyed in the signals.

56. A method according to claim 55, further comprising:
- determining, by the call processor, a respective alphanumeric representation corresponding to each identified instance of the predetermined characteristics;
- generating, by the call processor, data indicative of the alphanumeric representations; and
- outputting, by the call processor, the data for use by the software application to process the transaction.

57. A method according to claim 56, wherein the data comprises a respective emulated input device signal for each of the alphanumeric representations.

58. A method according to claim 5, further comprising identifying, by the call processor, the computing device from among a plurality of computing devices.

59. A method according to claim 58, wherein the determining is based on an IP address contained in the signals.

60. A method according to claim 56, further comprising encrypting, by the call processor, the data; and
wherein the outputting comprises outputting the encrypted data for transmission over a network to a computing device at a location remote from the call centre.

* * * * *